United States Patent
Deck

(10) Patent No.: US 7,321,430 B2
(45) Date of Patent: *Jan. 22, 2008

(54) VIBRATION RESISTANT INTERFEROMETRY

(75) Inventor: Leslie L. Deck, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 267 days.

This patent is subject to a terminal disclaimer.

(21) Appl. No.: 11/112,332

(22) Filed: Apr. 22, 2005

(65) Prior Publication Data

US 2005/0237535 A1  Oct. 27, 2005

Related U.S. Application Data

(60) Provisional application No. 60/564,477, filed on Apr. 22, 2004.

(30) Foreign Application Priority Data

Apr. 21, 2005 (TW) ............................ 94112683 A

(51) Int. Cl.
*G01B 11/02* (2006.01)
(52) U.S. Cl. ........................ 356/497; 356/495
(58) Field of Classification Search ............... 356/489, 356/495, 497, 511–515, 516
See application file for complete search history.

(56) References Cited

U.S. PATENT DOCUMENTS

| 4,340,306 A | 7/1982 | Balasubramanian |
| 4,818,110 A | 4/1989 | Davidson |

(Continued)

OTHER PUBLICATIONS

P. de Groot et al., "Step height measurements using a combination of a laser displacement gage and a broadband interferometric surface profiler," *Proceedings of SPIE* vol. 4778, pp. 127-130 (2002).

(Continued)

*Primary Examiner*—Gregory J. Toatley, Jr.
*Assistant Examiner*—Scott M Richey
(74) *Attorney, Agent, or Firm*—Fish & Richardson P.C.

(57) ABSTRACT

Scanning interferometry data for a test object is provided, the data typically including intensity values for each of multiple scan positions for each of different spatial locations of the test object. The intensity values for each spatial location define an interference signal for the spatial location, and the intensity values for a common scan position define a data set for that scan position. Scan values are provided for each scan position, in which scan value increments between various scan values can be non-uniform. Information is determined about the test object based on the scanning interferometry data and scan values. The determination includes transforming at least some of the interference signals into a frequency domain with respect to the scan values.

26 Claims, 15 Drawing Sheets

Scan Positions

U.S. PATENT DOCUMENTS

| | | |
|---|---|---|
| 5,112,129 A | 5/1992 | Davidson et al. |
| 5,133,601 A | 7/1992 | Cohen et al. |
| 5,204,734 A | 4/1993 | Cohen et al. |
| 5,323,012 A | 6/1994 | Auslander et al. |
| 5,343,294 A | 8/1994 | Kuchel et al. |
| 5,355,201 A | 10/1994 | Hwang |
| 5,398,113 A | 3/1995 | de Groot |
| 5,402,234 A | 3/1995 | Deck |
| 5,589,938 A | 12/1996 | Deck |
| 5,777,741 A | 7/1998 | Deck |
| 6,624,894 B2 | 9/2003 | Olszak et al. |
| 6,882,432 B2 | 4/2005 | Deck |
| 7,106,454 B2 * | 9/2006 | De Groot et al. ............ 356/511 |
| 2001/0043333 A1 * | 11/2001 | De Groot et al. ............ 356/511 |
| 2004/0189999 A1 * | 9/2004 | De Groot et al. ............ 356/497 |
| 2005/0237534 A1 * | 10/2005 | Deck ............................ 356/497 |
| 2005/0259265 A1 * | 11/2005 | De Lega ...................... 356/497 |
| 2007/0046953 A1 * | 3/2007 | De Groot et al. ............ 356/512 |

OTHER PUBLICATIONS

J. Schmit et al., "White light interferometry with reference signal," *Proceedings of SPIE* vol. 4777, pp. 102-109 (2002).

De Groot, P. and Deck, L., "Surface Profiling by Analysis of White-Light Interferograms in the Spatial Frequency Domain", J. Mod. Opt., 42(2), pp. 389-401 (1995).

* cited by examiner

T1

T2

T3

VIBRATION RESISTANT INTERFEROMETRY

RELATED APPLICATION

The present application claims the benefit of U.S. provisional application No. 60/564,477, filed Apr. 22, 2004, and claims priority under 35 U.S.C. §119(a) to Taiwanese application no. 94112683, filed Apr. 21, 2005, both of which applications are incorporated herein in their entireties.

FIELD OF THE INVENTION

The invention relates to scanning interferometry methods as well as to related systems.

BACKGROUND

Scanning white light interferometry (SWLI) is an optical profiling procedure by which a nominally equal path interferometer is illuminated by a broad band source (typically but not limited to white light) while one leg of the interferometer is axially moved (scanned) through the equal path condition (the condition when the optical path length of the two legs of the interferometer are equal). The interference signals are captured by an optical sensor, typically a camera during the scan. Interference fringes only occur in the neighborhood of the equal path condition, providing a signal to compute the relative height of the various image points of the surface illuminated by one leg to the corresponding image point in the other leg. All SWLI methods typically assume a constant scanning motion (i.e. constant velocity). If the scanning motion is not uniform, errors in the measured surface profile occur.

Unfortunately, it is often the case that the scanning motion in SWLI is not uniform. This can occur due to nonlinear motions of the scanning mechanism, or through vibrations that act on each interferometer leg differently.

SUMMARY

Methods and systems are disclosed that provide a low-cost way to reduce the sensitivity of surface profile measurements using SWLI to vibration and/or nonlinear scans. They include a generalized Fourier domain SWLI processing technique called GFDA that can handle arbitrary SWLI scan motion provided the scan motion itself is known.

In some embodiments, the scan motion is determined using the SWLI data itself by measuring the phase shift increments between camera frames (e.g., data sets) via a spatial carrier fringe technique. In other embodiments, the scan motion is determined by measuring the phase shift increments between camera frames via an additional inline displacement measuring sensor. In further embodiments, the scan motion is determined by measuring the phase shift increments between camera frames via an additional external displacement measuring sensor.

In general, in one aspect, the invention features a method including: (i) providing scanning interferometry data for a test object, the data including intensity values at each of multiple scan positions for each of different spatial locations of the test object; (ii) providing values for the scan positions; and (iii) determining information about the test object based on the scanning interferometry data at each of the different spatial locations and the scan positions.

Embodiments of the method may include any of the following features.

Determining the information about the test object may include transforming the scanning interferometry data at each of the different spatial locations into a spatial frequency domain with respect to the values for the scan positions.

The scan positions may vary nonlinearly with time.

A light source having a coherence length may be used to generate the scanning interferometry data, and the scan positions may span a range larger than the coherence length of the light source.

A light source having a center frequency may be used to generate the scanning interferometry data, and the light source may have a spectral width greater than 2% of the center frequency.

Providing the values for the scan positions may include determining the scan positions.

The scan positions may be determined from the intensity values of the scanning interferometry data over at least some of the multiple spatial locations. For example, determining the scan positions may include transforming the intensity values at the different spatial locations into a spatial frequency domain for each of at least some of the scan positions.

Determining the scan positions may include using an inline displacement sensor.

Determining the scan positions may include using an external displacement sensor (e.g., a displacement measuring interferometer).

In some embodiments, a method includes providing scanning interferometry data for a test object, the data comprising intensity values for each of multiple scan positions for each of different spatial locations of the test object, the intensity values for each spatial location defining an interference signal for the spatial location, the intensity values for a common scan position defining a data set for that scan position. A scan value is provided for each scan position. Increments between the scan values are non-uniform. At least some of the interference signals are transformed into a frequency domain with respect to the scan values. Information about the test object is determined based on the transformed interference signals.

Transforming at least some of the interference signals into a frequency domain with respect to the scan values can include transforming the at least some interference signals over a range of scan positions greater than a coherence length of a light source used to generate the scanning interferometry data.

The scanning interferometry data can be acquired using a light source having a center frequency and the light source has a spectral width greater than 2% of the center frequency.

In some embodiments, the scan values are determined based on the scanning interferometry data and an initial estimate of values for the scan positions.

Determining the scan positions can include determining the scan positions based on a property of light that has passed through an optic used to receive light reflected from the test object. An in-line sensor may be used to measure the scan positions.

Determining the scan positions can include determining the scan positions based on a property of light that has not passed through an optic used to receive light reflected from the test object. An external sensor may be used to measure the scan positions. The external sensor may be a displacement measuring interferometer.

In some embodiments, a method includes providing scanning interferometry data for a test object, the data comprising an intensity value corresponding to each of different spatial locations of the test object for each of multiple scan positions. Information related to the spatial locations of the test object is determined based on the scanning interferometry data. A scan value is determined for one of the multiple scan positions based on a relationship between the intensities of that scan position and the information related to the spatial locations to which the intensities of that scan position correspond. A scan value may be determined for each of additional ones of the multiple scan positions.

The information related to the spatial locations of the test object may be determined on the further basis of an initial scan value for each of the scan positions.

The scan position for which the scan value is determined may be a first scan position spaced apart from a second scan position by a scan position increment and determining a scan value for the first scan position can include determining a scan value increment for the scan position increment based on (a) the relationship between the intensities of the first scan position and the information related to the spatial locations to which the intensities of the first scan position correspond and (b) a relationship between the intensities of the second scan position and the information related to the spatial locations to which the intensities of the second scan position correspond.

Determining the scan value for the scan position can include transforming the intensities of the scan position into a frequency domain with respect to the information related to the spatial locations to which the intensities of the scan position correspond. The transformation may be a one-dimensional transformation.

Determining the scan value for the scan position can include determining a phase of a fundamental frequency of an oscillation of the intensities of the scan position with respect to the information related to the spatial locations to which the intensities of the scan position correspond. Determining the phase of the fundamental frequency can include using information about a phase of a frequency of at least a second oscillation of the intensities of the scan position with respect to the information related to the spatial locations to which the intensities of the scan position correspond. The frequency may be at least 3 times the fundamental frequency. Information from additional, higher frequencies, may also be used.

In some embodiments, a method includes providing scanning interferometry data for a test object. The data includes an intensity value corresponding to each of different spatial locations of the test object for each of multiple scan positions. In formation related to the spatial location of the test object is determined based on the scanning interferometry data. A scan value increment between a pair of the scan positions is determined based on (a) a relationship between intensities of a first scan position of the pair and the information related to the spatial locations to which the intensities of the first scan position correspond and (b) a relationship between the intensities of a second scan position of the pair and the information related to the spatial locations to which the intensities of the second scan position correspond.

The information about the test object may be determined on the basis of both the scanning interferometry data and initial scan values for the scan positions (e.g., by transforming interference signals of the scanning interferometry data into a frequency domain with respect to the initial scan values).

The pair of scan positions may be a first pair of scan positions and the method may further include repeating the determining a scan value increment to determine a scan value increment between other pairs of the scan positions. A scan value increment may be determined between all pairs of successive scan positions. The scan value increments may be non-uniform.

The method may include determining information about the test object based on the scanning interferometry data and the scan value increments (e.g., by transformation of interference signals of the scanning interferometry data with respect to the scan value increments).

Determining a scan value increment can include fitting a first function to the at least some intensities of the first one of the scan positions and the information related to the spatial locations corresponding to the at least some intensities and fitting a second function to the at least some intensities of the second one of the scan positions and the information related to the spatial locations corresponding to the at least some intensities. The scan value increments can be determined based on fitted parameters of the first and second functions.

Determining a scan value increment can include transforming at least some of the intensity values of the first scan position into a frequency domain with respect to the information related to the spatial locations corresponding to the intensity values and transforming at least some of the intensity values of the second scan position into a frequency domain with respect to the information related to the spatial locations corresponding to the intensity values.

Determining a scan value increment between a pair of scan positions can include determining an offset between (a) a fundamental frequency of an oscillation of the at least some intensities of the first one of the scan positions with respect to the information related to the spatial locations corresponding to the at least some intensity values of the first one of the scan positions and (b) a fundamental frequency of an oscillation of the at least some intensities of the second one of the scan positions with respect to the information related to the spatial locations corresponding to the intensity values of the second one of the scan positions. Determining the offset can include using information from an oscillation of at least about 3 times the fundamental frequency of the at least some intensities of the first one of the scan positions with respect to the information related to the spatial locations corresponding to the at least some intensity values of the first one of the scan positions and using information from an oscillation of about 3 times the fundamental frequency of the at least some intensities of the first one of the scan positions with respect to the information related to the spatial locations corresponding to the at least some intensity values of the second one of the scan positions.

In some embodiments, a method comprises providing scanning interferometry data for a test object, the data comprising intensity values for each of multiple scan positions for each of different spatial locations of the test object, the intensity values for each spatial location defining an interference signal for the spatial location, the intensity values for a common scan position defining a data set for that scan position. Information about a test object is determined by transforming at least some of the interference signals into a frequency domain with respect to initial values for the scan positions. Based on the scanning interferometry data and the information about the test object, a scan value is determined for each of at least some of the scan positions. The scan values may be scan value increments between pairs of scan positions.

Information about the test object may be determined based on the scanning interferometry data and the scan values for the scan positions. Determining information about the test object can include transforming at least some of the interference signals into a frequency domain with respect to the scan values.

Scan value increments between the scan values may be non-uniform.

Transforming at least some of the interference signals into a frequency domain with respect to the scan positions can include transforming the at least some interference signals over a range of scan positions greater than a coherence length of a light source used to generate the scanning interferometry data.

The scanning interferometry data can be acquired using a light source having a center frequency and the light source has a spectral width greater than 2% of the center frequency.

In another embodiment, a system includes an interferometer configured to provide scanning interferometry data for a test object, the data comprising intensity values for each of multiple scan positions for each of different spatial locations of the test object, the intensity values for each spatial location defining an interference signal for the spatial location, the intensity values for a common scan position defining a data set for that scan position and a processor configured to transform at least some of the interference signals into a frequency domain with respect to initial values for the scan positions and determine, based on at least some of the transformed interference signals, a respective scan value for each of at least some of the scan positions.

In another embodiment, a system includes an interferometer configured to provide scanning interferometry data for a test object, the data comprising intensity values for each of multiple scan positions for each of different spatial locations of the test object, the intensity values for each spatial location defining an interference signal for the spatial location, the intensity values for a common scan position defining a data set for that scan position and a processor configured to transform the interference signals for each of different spatial locations into a spatial frequency domain with respect to scan values, each scan value corresponding to a scan position. A difference between different scan values is non-uniform.

The system may include a sensor with the processor configured to determine the second scan values based on data received from the sensor.

The processor may be configured to determine scan values based on at least some intensity values of the scanning interferometry data and, optionally, initial scan values for the scan positions.

The processor may be configured to determine information about the test object based on the intensity values transformed with respect to the second scan values.

In some embodiments, a system includes an interferometer configured to provide scanning interferometry data for a test object, the data comprising an intensity value corresponding to each of different spatial locations of the test object for each of multiple scan positions and a processor configured to determine information related to the spatial locations of the test object based on the scanning interferometry data and determine a scan value for a scan position based on a relationship between the intensities of the scan position and the information related to the spatial locations to which the intensities of the scan position correspond. The processor may be configured to determine information about the test object based on information related to the scan value.

In some embodiments, a method includes providing scanning interferometry data for a test object. The data include intensity values at each of multiple scan positions for each of different spatial locations of the test object. Scan values are provided for the scan positions. Information about the test object is determined based on the scanning interferometry data at each of the different spatial locations and the scan positions.

Determining the information about the test object can include transforming the scanning interferometry data at each of the different spatial locations into a spatial frequency domain with respect to the scan values for the scan positions. The scan positions may vary nonlinearly with time.

In some embodiments, a light source having a coherence length is used to generate the scanning interferometry data. The scan positions may span a range larger than the coherence length of the light source.

In some embodiments, a light source having a center frequency is used to generate the scanning interferometry data. The light source can have a spectral width greater than 2% of the center frequency.

Providing the scan values for the scan positions may include determining the scan positions. In some embodiments, the scan positions are determined from the intensity values of the scanning interferometry data over at least some of the multiple spatial locations. For example, determining the scan positions can include transforming the intensity values at the different spatial locations into a spatial frequency domain for each of at least some of the scan positions.

In some embodiments, determining the scan positions includes using an inline displacement sensor.

In some embodiments, determining the scan positions includes using an external displacement sensor. The external displacement sensor may be a displacement measuring interferometer.

In another aspect, the invention features a system including: (i) a scanning interferometer configured to provide scanning interferometry data for a test object, the data including intensity values at each of multiple scan positions for each of different spatial locations of the test object; (ii) means for determining the scan positions; and (iii) an electronic controller configured to transform the scanning interferometry data at each of the different spatial locations into a spatial frequency domain with respect to the measured scan positions, and determine information about the test object based on the transformed scanning interfometry data at each of the different spatial locations.

In some embodiments, the system includes a scanning interferometer configured to provide scanning interferometry data for a test object. The data include intensity values at each of multiple scan positions for each of different spatial locations of the test object. The system also includes means for determining the scan positions and an electronic controller configured to transform the scanning interferometry data at each of the different spatial locations into a spatial frequency domain with respect to the measured scan positions and determine information about the test object based on the transformed scanning interferometry data at each of the different spatial locations.

The systems may further include features corresponding to the method described above.

Unless otherwise defined, all technical and scientific terms used herein have the same meaning as commonly understood by one of ordinary skill in the art to which this invention belongs.

Other features, objects, and advantages of the invention will be apparent from the following detailed description.

DETAILED DESCRIPTION

Figure 1:
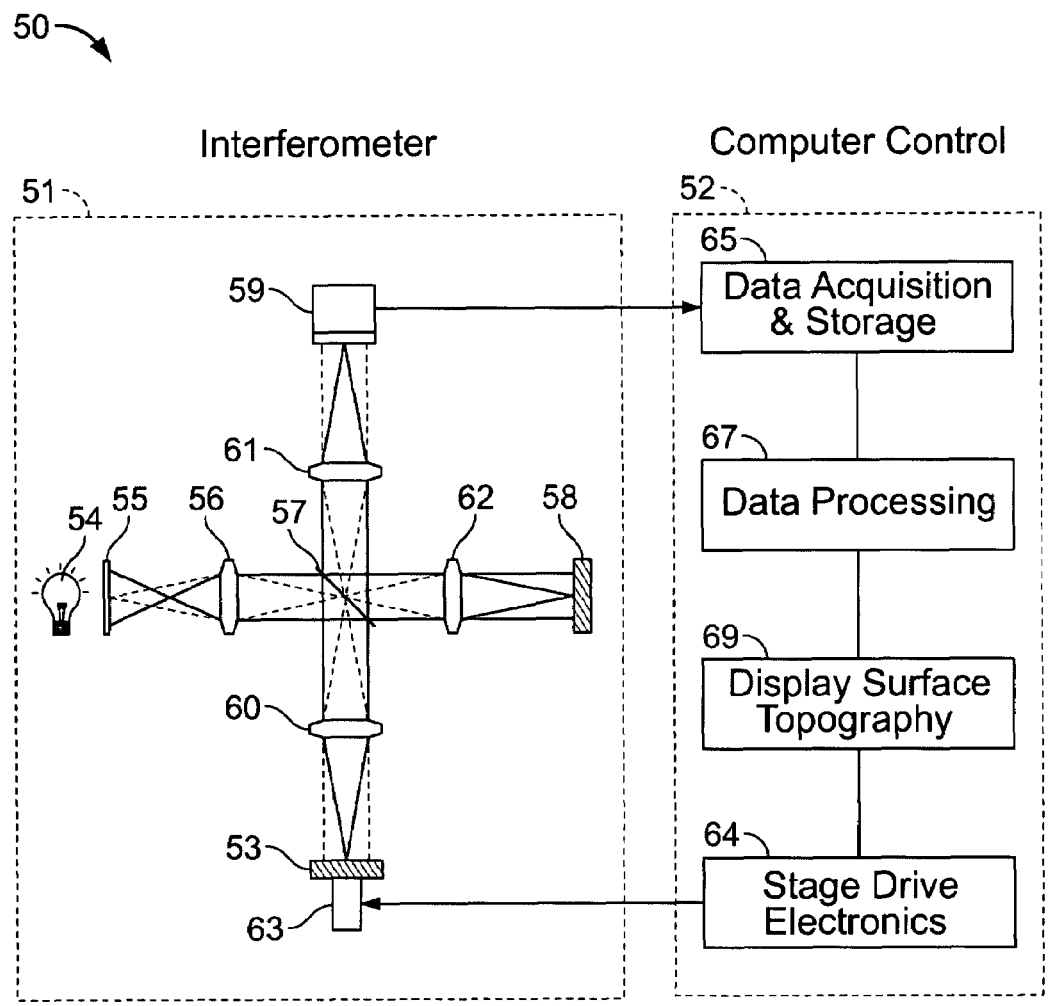
FIG. 1 shows an embodiment of a scanning interferometry system.

Scanning interferometry data are generally obtained by detecting the intensity of interference between light (e.g., ultraviolet light, visible light, or infrared light) reflected from a test object and light reflected from a reference object. The intensity of the interference depends on an optical path difference (OPD) between the light reflected from the test object and light reflected from the reference object. For each spatial location of the test object (e.g., for each of different locations about a surface of the test object), the OPD depends upon properties of the spatial location (e.g., the height of the spatial location).

Typically, scanning interferometry data are obtained by using a scan mechanism to vary the OPD between the light reflected from the test object and the light reflected from the reference object. The scanning mechanism generally moves at least one of the test and reference objects through multiple scan positions along a scan dimension (e.g., continuously or in discrete steps). Each scan position corresponds to a different OPD between the test and reference objects. For each scan position, a detector detects the intensity of interference for each of multiple spatial locations of the test object. The intensities can be used to determine information about the test object.

Information about a test object that can be determined from scanning interferometry data includes, for example, information related to a spatial property (e.g., a height such as relative height) of one or more spatial locations of the test object. Examples of information related to a spatial property (e.g., height) of a test object include an OPD (e.g., an OPD corresponding to a spatial location of the test object) and a phase of interference (e.g., a phase of interference between light reflected from a spatial location of the test object and light reflected from the reference object).

Determining information about the test object typically includes the use of initial scan values for the scan positions. Use of the initial scan values assumes ideal scan mechanism motion (e.g., uniform and precise motion) along the scan dimension. Hence, scan value increments between the initial scan values are uniform along the scan dimension. In practice, scan mechanism motion tends to have some degree of non-ideality (e.g., non-uniformity and/or imprecision). One source of non-ideal scan mechanism motion includes vibrations (e.g., from air currents and/or nearby machinery), which can cause one or both of the test and reference objects to move (e.g., vibrate) with respect to the other. Another source of non-ideal scan mechanism motion includes non-uniform (e.g., non-linear) motion of the scan mechanism along the scan dimension. The use of initial scan values that incorporate the assumption of ideal scan mechanism motion can introduce artifacts (e.g., errors) into the information about the test object.

As described herein, scan values can be provided for each of at least some (e.g., all) of the scan positions of scanning interferometry data for a test object. In general, the scan values can accommodate for non-ideal motion of the scan mechanism. At least some (e.g., most or all) of the scan value increments between different scan values may be different (e.g., the scan value increments may be non-uniform).

Information about the test object can be determined based on the scanning interferometry data and the scan values. Typically, the information about the test object determined based on the scan values contains fewer artifacts (e.g., fewer and smaller magnitude errors) with respect to the test object than information determined based on initial scan values that incorporate the assumption of ideal scan mechanism motion.

Scan values provided for the scan positions can be expressed in many different units (e.g., units of phase, distance, and/or OPD). The scan values can be absolute (e.g., the scan values can relate to an absolute (e.g., total) OPD between test and reference objects) or relative (e.g., the scan values can be scan value increments related to an incremental OPD change between the test and reference objects for different (e.g., successive) scan positions). Scan values can be expressed as scan value increments related to increments between absolute scan values.

In some embodiments, the information about the test object is determined based on interference signals corresponding to each of at least some of different test object spatial locations. The determination can include transforming (e.g., by Fourier methods) the interference signals into a frequency domain with respect to the scan values. Such methods can generalize transform methods to account for non-ideal scan mechanism motion.

In some embodiments, scan values (e.g., relative scan values, such as scan value increments) for the scan positions (e.g., for the scan position increment between one or more scan positions) are determined using the scanning interferometry data themselves. For example, determining a scan value for a scan position can include determining information related to multiple spatial locations of a test object based on scanning interferometry data and determining a scan value for the scan position based on a relationship between the intensities of the scan position and the information related to the spatial locations to which the intensities of the scan position correspond. Typically, the information related to the spatial locations is related to the heights of the spatial locations.

In some embodiments, scan values are obtained for each scan position while obtaining the scanning interferometry data (e.g., by measuring the nominal OPD corresponding to the scan position and/or by measuring the deviation from ideality of the OPD created by the scan mechanism motion). For example, the scan values can be measured with an external displacement sensor (e.g., a sidecar sensor) mounted, for example, externally to an interferometer (e.g., to a microscope thereof) and rigidly attached either to a scanner apparatus of the interferometer or to the microscope body (e.g., to its gantry). The sensor independently monitors the distance between itself and the test object. Depending on what is monitored, the scan values can be used either as a direct measure of the scan positions or as a measurement of the deviation from expected scan positions.

Referring now to FIG. 1, an exemplary interferometer system 50 for obtaining interference signals includes an interferometer 51 and a processor 52 (e.g., an automated computer control system). The measurement system 50 is operable to obtain scanning interferometry data of spatial locations of a test object 53.

Measurement system 50 includes a light source 54, a first focusing optic (e.g., one or more lenses) 56, a beam splitting element 57, a second focusing optic 62, a reference object 58, a third focusing optic 60, and a detector 59. Light source emits 54 emits spectrally-broadband light (e.g., white light), which illuminates a diffusing screen 55. First focusing optic 56 collects light from screen 55 and transmits collimated light to beam-splitting element 57, which splits the collimated light into first and second portions. A first portion of the collimated light is received by second focusing optic 62, which focuses the first portion of the light onto reference object 58. Light reflected from the reference object is received by second focusing optic 62, which transmits collimated light reflected by the reference object 58 back to beam-splitting element 57. Beam-splitting element 57 directs the second portion of the collimated light to third focusing optic 60, which focuses the light onto test object 53. Light reflected from test object 53 is received by third focusing optic 60, which transmits collimated light reflected by test object 53 back to beam-splitting element 57. Beam-splitting element 57 combines light reflected from reference object 58 and test object 53 and directs the combined light to a fourth focusing optic 61, which focuses the combined light to a detector 59.

Detector 59 is typically a multidimensional detector (e.g., a charge coupled device (CCD) or charge injection device (CID)) having a plurality of detector elements (e.g., pixels) arranged in one or more dimensions (e.g., two dimensions). Optics 60 and 61 focus light reflected from test object 53 onto detector 59 so that each detector element of detector 59 receives light reflected from a corresponding spatial location (e.g., a point or other small region) of test object 53. Light reflected from respective spatial locations of test object 53 and light reflected from reference object 58 interferes at detector 59. Each detector element produces a detector signal related to the intensity of the interfering light.

System 50 is configured to measure interference signals related to spatial locations of test object 53. Typically, system 50 creates an OPD between light reflected from reference object 58 and light reflected from test object 53. For example, test object 53 can be displaced through a number of scan positions along a scan dimension axis by a scan mechanism (e.g., an electromechanical transducer 63 (e.g., a piezoelectric transducer (PZT)), and associated drive electronics 64) controlled by computer 52. In some embodiments, a scan position increment between successive scan positions is at least about $\lambda/15$ (e.g., at least about $\lambda/12$, at least about $\lambda/10$), where $\lambda$ is a mean wavelength of the light detected at each pixel.

For each scan position, detector 59 outputs an intensity value (e.g., the intensity detected by a given detector element) for each of multiple different spatial locations of the test object. Taken along the scan dimension, the intensity values for each spatial location define an interference signal corresponding to the spatial location. The intensity values corresponding to a common scan position define a data set (e.g., an interferogram) for that scan position.

Figure 2:
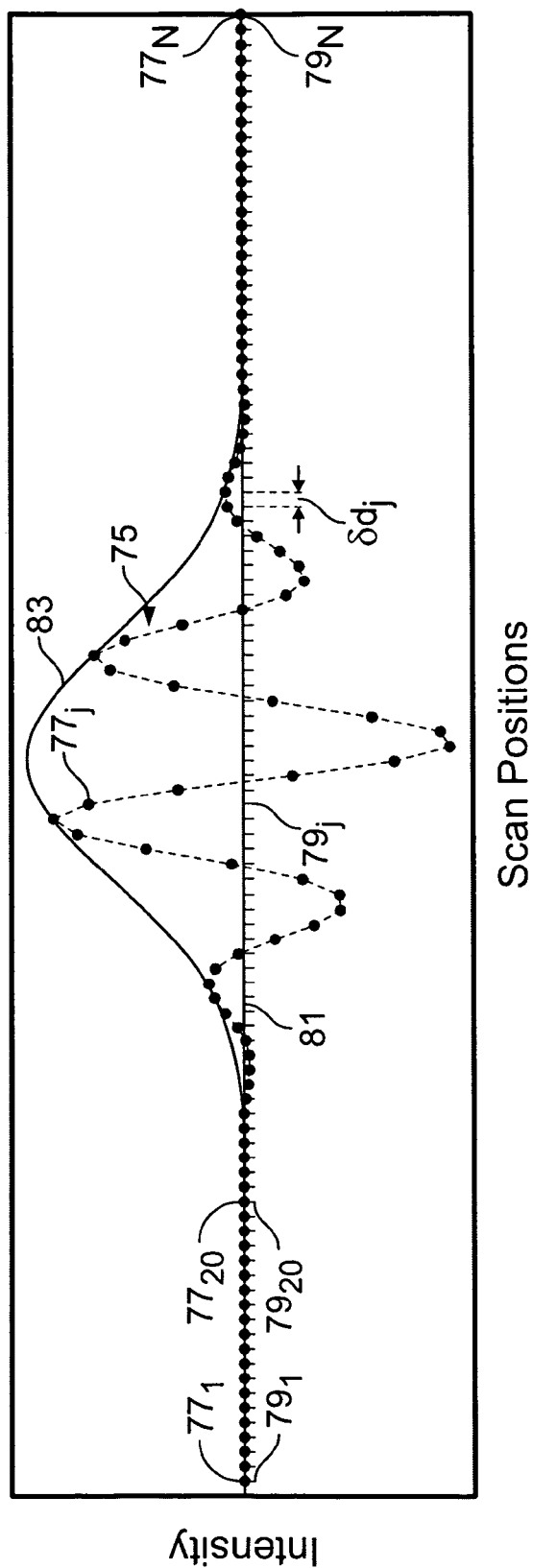
FIG. 2 shows an interference signal corresponding to a spatial location of a test object.

Referring to FIG. 2, an exemplary interference signal 75 includes an intensity value 77j for each of N scan positions $79_i$ along a scan dimension axis 81. The intensity values 77j of interference signal 75 correspond to a single spatial location of a test object. As discussed above, scan position increments between successive scan positions are typically uniform.

Intensity values 77j map out a number of oscillations (e.g., fringes), which decay on either side of a maximum according to a low coherence envelope 83, which does not expressly appear in such interference signals but is shown for clarity. The width of coherence envelope 83 corresponds generally to the coherence length of the detected light. Among the factors that determine the coherence length are temporal coherence phenomena related to, for example, the spectral bandwidth of the light, and spatial coherence phenomena related to, for example, the range of angles of incidence of light illuminating the test object. As can be seen from FIG. 2, interference signal 75 results from detecting intensity values over a range of scan positions 79j that is greater than about ¾ of the width of the coherence envelope. In some embodiments, the intensity values are detected over a range of scan positions that is greater than the width of the coherence envelope and, therefore, greater than the coherence length of the detected light.

In some embodiments, the motion of the scan mechanism is continuous along the scan dimension. In the absence of non-ideal scan mechanism motion, the time-dependent interference intensity s(t) detected by a given pixel can be described as:

$$s(t)=I_0\{1+V\cos[\Phi+\phi(t)]\} \quad \text{(Eq. 1)}$$

where $I_0$ is the average interference intensity, V is the contrast of the interference intensity variation (e.g., the fringe contrast), $\phi(t)$ is the change in the interference phase introduced by the scanning mechanism motion along the scan dimension axis, and $\Phi$ is the interference starting phase, which is related to information about the test object spatial location corresponding to the given pixel. In general, $\phi(t)$ is given by $\phi(t)=2\pi v_0 t$, where $v_0$ is the fundamental frequency of oscillation along the scan dimension axis, given by $v_0=2v_s/\lambda$, where $\lambda$ is the mean wavelength of the detected light.

In the presence of vibrations, the time-dependent interference intensity detected at each pixel can be described as:

$$s(t)=I_0\{1+V\cos[\Phi+\phi(t)+r\cos(2\pi v_v t+\alpha)]\} \quad \text{(Eq.2)}$$

where $v_v$ is the frequency of the intensity disturbance, $\alpha$ is starting phase of the intensity disturbance, and r is the disturbance amplitude. As discussed above, the presence of the vibrations and other non-ideal scan mechanism motion can introduce errors when information about the object is determined from interference signals based on initial scan values (which neglect non-ideal scan mechanism movement). The errors introduced by the vibrational disturbance contaminate not only the interference signals along the scan dimension axis but the intensity values detected for a common scan position. Although not reflected by Eq. 2, errors introduced by non-uniform scan mechanism motion also perturb both the interference signals and the intensity data for each scan position.

Typically, the scan mechanism of system 50 moves continuously through the scan positions and the system acquires intensity values for each scan position by integrating the intensity detected by each pixel for a time $\Delta t$ centered about each scan position. The rate of data set acquisition is given by $(\Delta t)^{-1}$. In general, $(\Delta t)^{-1}$ is smaller than $v_v$. For example, in some embodiments, the ratio $(\Delta t)^{-1}/v_v$ is about 0.75 or less (e.g., about 0.5 or less, about 0.3 or less, about 0.2 or less, about 0.15 or less). In an exemplary embodiment, the ratio $(\Delta t)^{-1}/v_v$ is about 0.1.

Intensity values are typically obtained for each of at least about 64 (e.g., at least about 128) scan positions. In some embodiments, intensity values are obtained at each of about 1028 scan positions or fewer (e.g., about 514 scan positions or fewer, about 256 scan positions or fewer).

In general, detector 59 includes at least about 4,000 (e.g., at least about 256,000, at lest about 1,024,000) detector elements. The scanning interferometry data typically include a number of interference signals equal to the number of detector elements and corresponding to the same number of test object spatial locations. Processor 50 can process the scanning interferometry data (e.g., using methods described herein) to determine, for example, information about the test object.

Light source 54 is typically a spectrally-broadband source (e.g., a white-light lamp) or a source including a plurality of different wavelengths (e.g., a plurality of light emitting diodes each producing a different wavelength). In some embodiments, the light reflected from the test object 53 and reference object 58 has a center frequency and a spectral width greater than 2% of the center frequency. In some embodiments, the scanning interferometry data are scanning white light interferometry (SWLI) data.

As an alternative or in combination with a broadband source, the light source 54 can include a narrow band or quasi-monochromatic source, typically having a high numerical aperture. A low coherence interference signal can be obtained using a monochromatic source in combination with a high numerical aperture, e.g., the coherence length may be on the order of a few microns or less.

In some embodiments, scanning interferometry data are acquired by changing the OPD over a range about equal to or smaller than a coherence length of the light detected after reflection from test object 53 and reference object 58. For example, light source 54 may be a laser having a line width much narrower and a coherence length much longer than the spectral width and coherence length of a white light lamp.

In some embodiments, reference object 58 is optically flat and includes only a single reflecting surface. For example, reference object 58 can be a reference mirror. In some embodiments, reference object 58 exhibits a three-dimensional surface topography.

We turn next to methods for determining information about a test object. Before discussing scan values that accommodate non-ideal scan mechanism motion, we discuss methods for determining information about a test object based on initial scan values (e.g., initial scan values that assume ideal scan mechanism motion). An exemplary method for determining information about a test object includes transforming the interference signals of the scanning interferometry data into a frequency domain with respect to initial estimates of the scan positions. For example, a suitable transform-based method referred to as frequency domain analysis (FDA) is described in U.S. Pat. No. 5,398,113 to de Groot, the contents of which patent is incorporated herein by reference.

In general, FDA includes determining the transform of the interference signal obtained by varying the OPD along a scan dimension. The height Z of each test object spatial location is determined from the phase slope of the transformed interference signal of the corresponding pixel given by:

$$Z = \frac{d\varphi}{dk} \quad \text{(Eq. 3)}$$

where ϕ is the phase of the transformed interference signal and k is the conjugate variable to scanning dimension coordinate of the untransformed interference signals. Typically, k is a wavenumber given by k=4π/λ, where λ is a wavelength of light of the interference signal. The definition of the wavenumber k incorporates a factor of 2 increase in OPD for each incremental increase in scan value. The height Z (e.g., the phase slope) can be determined by, for example, fitting a plot of phase ϕ vs. wavenumber k for several highest power spectral components. A higher precision estimate of object height can be based on the phase of the transformed interference signal at a high power wavenumber and using the phase slope Z to unwrap any 2π ambiguity.

The foregoing analysis uses initial scan values that incorporate the assumption of ideal scan mechanism motion (e.g., increments between the initial scan values are typically uniform). As discussed above, however, non-ideal scan mechanism motion can cause the actual scan positions to deviate from those expected based on operation of the interferometer.

We next turn to a discussion of a method for determining information about a test object based on scan values $z_j$ that accommodate non-ideal scan mechanism motion (e.g., vibration and/or non-uniform scan mechanism motion). Here, we assume that these scan values $z_j$ can be provided. Below, we discuss methods for providing (e.g., determining) the scan values $z_j$.

In some embodiments, the method for determining information based on the scan values $z_j$ includes a generalized transformation of one or more interference signals of scanning interferometry data with respect to the scan values $z_j$. Information determined on the basis of the generalized transformation typically includes fewer artifacts (e.g., errors) caused by non-ideal scan mechanism motion as compared to information determined on the basis of an initial estimate of scan values that neglect non-ideal motion.

In general, the scan value $z_j$ for the jth scan position is related to the scan value increments $\partial z_j = z_j - z_{j-1}$ between the scan values by:

$$z_j = \bar{z} + \sum_{i=0}^{j-1} \delta z_i,$$ (Eq. 4)

where $\bar{z}$ corresponds to a scan position offset, which is typically about zero (e.g., $\bar{z}$ generally corresponds to an OPD between the test and measurement objects of about zero).

Typically, the scan value increments $\delta z_j$ between different scan values are different (e.g., non-uniform) along the scan dimension axis. For example, the scan value increments can include a random (or oscillatory) component that accounts for scan position errors introduced by vibrations. The scan value increments can also include a systematically changing component (e.g., a component that increases or decreases) along at least a portion (e.g., all) of the scan dimension axis that accounts for scan position errors introduced by non-uniform scan mechanism motion. Such systematic components can be linear or non-linear.

A generalized transform for transforming an interference signal into a frequency domain with respect to the scan values $z_j$ is given by:

$$P(k) = \sum_j p_j \exp(ik(z_j - \bar{z})) \partial z_j$$ (Eq. 5)

where P(k) is the interference signal transformed based on the scan values zj, $p_j$ is intensity value of the interference signal for the jth scan value zj, and k is defined as above.

Information about each test object spatial location is typically determined based on the phase of at least one wavenumber of the transformed data. The phase ϕ(k) of the interference signal at wavenumber k is given by:

$$\phi(k) = \arg(P(k)) = a\tan(Im(P(k))/Re(P(k)))$$ (Eq. 6), where Im(P(k)) is the imaginary portion of the transformed interference signal at wavenumber k and Re(P(k)) is real portion of the transformed interference signal at wavenumber k. The height of each test object spatial location can be determined, for example, as described above based on a fit to a phase ϕ vs. wavenumber k plot of several high power spectral components. A higher precision estimate of object height can be based on the phase of the transformed interference signal at a high power wavenumber and using the phase slope to unwrap any 2π ambiguity.

Typically, information about a test object spatial location corresponding to the transformed interference signal is determined based on one or more wavenumbers of the transformed interference signal adjacent (e.g., coincident and/or straddling) the mean wavenumber $k_0$, which is related to the mean wavelength $\lambda_0$ of the light of the interference signal by $k_0 = 4\pi/\lambda_0$. Wavenumbers adjacent $k_0$ typically have a spectral amplitude |P(k)| greater than a threshold, which can be chosen as desired (e.g., to reduce the impact of noise on the result).

The foregoing discussion assumes that scan values $z_j$ can be provided for at least some (e.g., all) scan positions. We turn now to methods for determining the scan values $z_j$ (e.g., the scan value increments $\partial z_j$) that accommodate non-ideal scan mechanism motion. As discussed with respect to Eq. 2, non-ideal scan motion perturb both the interference signals along the scan dimension axis and the intensity values observed for each common scan position. Hence, the intensity values contain information about the non-ideal scan mechanism motion. In some embodiments, the scan values $z_j$ are determined from scanning interferometry data of a test object.

Figure 3:
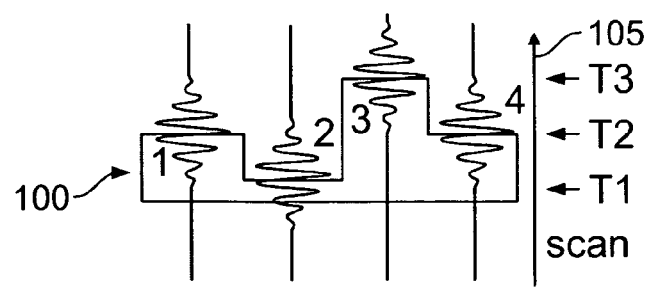
FIG. 3 illustrates a schematic side view of a test object and interference signals corresponding to different test object spatial locations.
Figure 4A:
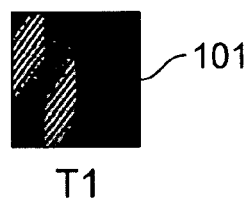
FIGS. 4a-4c illustrates intensity values obtained for common scan positions from different spatial locations of the test object of FIG. 3.
Figure 4B:
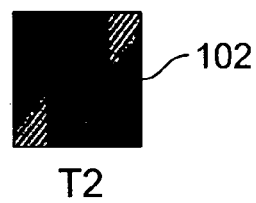
Figure 4C:
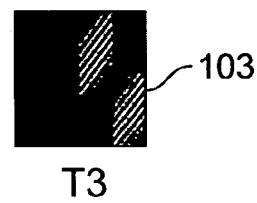

Typically, the scanning interferometry data include an intensity value for each of multiple spatial locations of the test object for each of multiple scan positions (e.g., the data include an interference signal for each of multiple test object spatial locations and a data set for each of multiple scan positions). In some embodiments, the scanning interferometry data are obtained with the test and reference objects tilted with respect to one another to introduce spatial carrier fringes in the intensity values obtained for each scan position. FIG. 3 shows a schematic side view of a test object 100 and the relative position of interference signals resulting from each of 4 spatial locations with respect to a scan dimension axis 105. For example, at scan position T2 along scan dimension axis 105, interference from test object spatial locations 1 and 4 are at a maximum. FIGS. 4a-4c graphically shows the intensity values of a data set 101 for scan position T1, of a data set 102 for scan position T2, and of a data set 103 for scan position T3.

Figure 5:
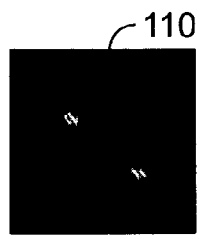
FIG. 5 illustrates the two-dimensional spatial transform of the intensity values of FIG. 4b.

The average of all the intensity values of the scanning interferometry data is subtracted from each intensity value to reduce the DC component in the spatial frequency domain for each data set. Each average-subtracted data set is transformed (e.g., by a 2-dimensional Fourier transformation) to a spatial frequency domain. The carrier signal peak position can be determined from the location of the $1^{st}$ order peak in the spatial frequency domain power spectrum. For example, as seen in FIG. 5, the spatial frequency domain power spectrum obtained from the transform of data set 102 shows positive and negative $1^{st}$ order peaks corresponding to the carrier signal peaks. Typically, the power spectra of several data sets are averaged to reduce noise.

Figure 6:
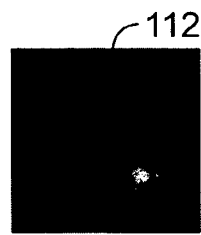
FIG. 6 illustrates a two-dimensional Fourier filter.
Figure 7:
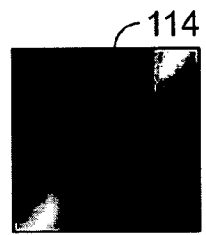
FIG. 7 illustrates the absolute value of inverse transform of the product of the spatial transform of FIG. 5 and the filter of FIG. 6.

The spatial frequency domain power spectrum is spatially filtered to extract only one of the $1^{st}$ order peaks (e.g., the positive peak). FIG. 6 shows a spatial filter 112. Typically, filtering is performed in the frequency domain as the product of the frequency domain power spectrum and spatial filter (of course, filtering could be performed by convolution in the spatial domain). The spatially filtered frequency domain power spectrum is inverse transformed (e.g., by an inverse Fourier transform) to obtain a complex surface map. FIG. 7 shows a complex surface map 114 obtained by inverse transforming the product of power spectrum 110 and spatial filter 112. The absolute value of the complex surface map indicates where interference appears in the corresponding data set (e.g., data set 102). To determine the scan increment $\delta z_j$ between each pair of data sets, the absolute values corresponding to the pixels of the surface map are searched for values that exceed a threshold, which can be selected as desired. The spatial phase at each pixel is given by the argument of the complex surface map at each pixel. The difference between the argument for a given pixel between different data sets indicates the scan value increment for those data sets.

Scan value increments are determined by unwrapping the phase variation for each pixel over multiple (e.g., all) data sets (e.g., within each interference signal) and calculating the scan value increment between scan positions corresponding to pairs of data sets. The increments $\delta z_j$ determined from pixels within each the data sets of each pair of data sets can be averaged together. The scan value $z_j$ for each data set can be determined from the sum of increments $\delta z_j$ as discussed above. The increments $\delta z_j$ between different scan values $z_j$ are typically different (e.g., the increments can be non-uniform). The scan values thus obtained can be used to determine information about the surface (e.g., by transforming the interference signals into a frequency domain with respect to the scan values and/or by another method).

While the foregoing method for determining scan values (e.g., scan increments $\delta z_j$) from scanning interferometry data has been described as including a two-dimensional transformation of the spatial distribution of intensities within one or more data sets, other methods for determining scan values from scanning interferometry data can be used. For example, in some embodiments, information about a test object (e.g., the phase of interference corresponding to one or more spatial locations, the height of one or more spatial locations, or the OPD corresponding to one or more spatial locations) is determined based on scanning interferometry data and, optionally, initial scan values for the scan positions. Typically, the information about the test object is determined by transforming the scanning interferometry data into a frequency domain with respect to initial scan values to determine heights of various spatial locations of the test object. For intensity values of a common scan position, the intensity values are plotted as a function of the information about the test object information that corresponds to the intensity values. For example, each intensity value from a common scan position can be plotted against the height of the test object spatial location that corresponds to that intensity value.

Figure 8:
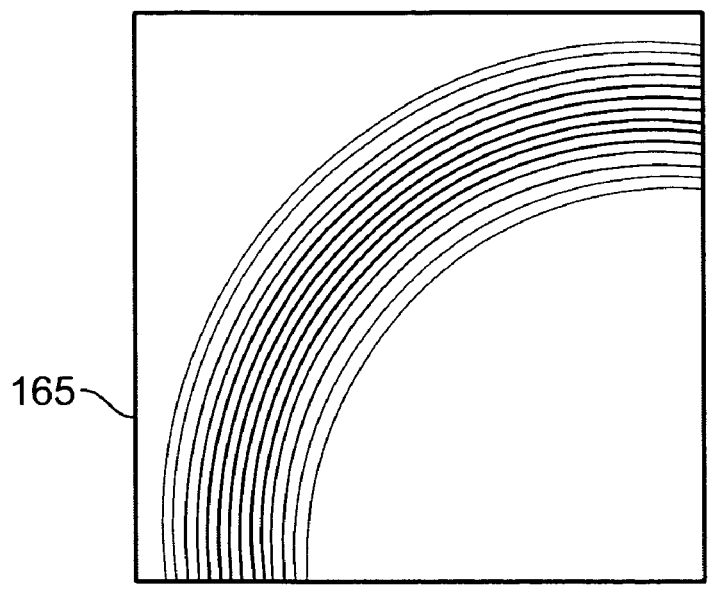
FIG. 8 illustrates the intensity values for a common scan position obtained for a common scan position from a spherical test object.

We now discuss the method further. The method typically includes obtaining scanning interferometry data from a test object. FIG. 8 shows an exemplary data set 165 representing the data set for the $165^{th}$ scan position of scanning interferometry data obtained from a spherical test object. Because the variation of the heights of the test object spatial locations within the field of view is greater than the coherence length of the detected light, fringes are only observed within a portion of the data set.

On the other hand, certain test objects (e.g., generally planar test objects) may have a distribution of surface heights that is small with respect to the wavelength of the detected interfering light. The number of fringes within each data set gathered from such objects may be small (e.g., substantially less than about 1 fringe). Typically, a tilt is introduced between such test objects and the reference object to introduce a greater number of fringes (e.g., at least about 1 fringe, at least about 2 fringes) within each data set. In some embodiments, the number of fringes created by the tilt is about 20 fringes or less (e.g., about 10 fringes or less, about 5 fringes or less, about 2 fringes or less). Typically, the extent of tilt and the width of the coherence envelope of the interfering light are such that high contrast fringes are not present over an entire data set. For example, high contrast fringes may be present over about 90% of a data set or less (e.g., over about 75% of a data set or less, over about 50% of a data set or less, over about 35% of a data set or less). Typically, the extent of tilt is insufficient to introduce significant retrace error into information determined about a test object.

The method of determining scan values $z_j$ proceeds by determining information related to the test object based on the scanning interferometry data and, optionally, initial values for the scan positions. Typically, the information about the test object is obtained by transforming the interference signals of the scanning interferometry data into a frequency domain with respect to the initial scan values for the scan positions (e.g., by using FDA analysis based on the initial scan values). However, other methods (e.g., analysis of the intensity values in the time or spatial domain of the scan positions) can be used to determine the information about the test object.

For each intensity value of a common scan position, the information related to the test object locations is typically expressed in units related to scan position. Of course, information about the test object can be expressed in other units (e.g., distance (e.g., nanometers) or phase (e.g., fractions of $2\pi$)). The intensity values for a common scan position are ranked (e.g., in ascending or descending order) based on the information about the test object spatial locations corresponding to each intensity value (e.g., the intensity values can be ranked in order of the height of the test object spatial location that corresponds to each intensity value).

Figure 9:
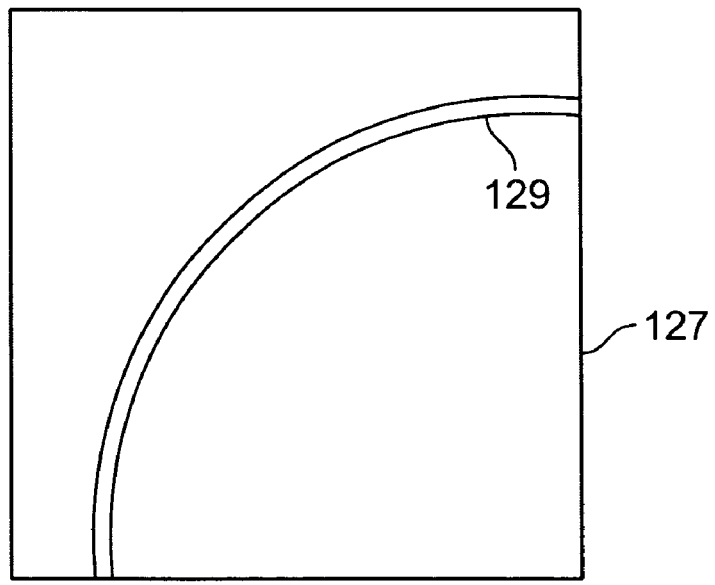
FIG. 9 illustrates a region of intensity values (e.g., pixels) of FIG. 8 for which the intensity values are within a range R of the maxima of the interference signals corresponding to the intensity values.

For each scan position, the intensity values are searched for intensity values that are within a number R scan position increments of the maximum of the corresponding interference signal. In general, R is about 25 or less (e.g., about 10 or less, about 7 or less, about 3) scan position increments. For example, referring to FIG. 9, a mask 127 indicates the location of a group 129 of intensity values (e.g., pixels) within data set 165. The interference signal corresponding to each intensity value (e.g., each pixel) within group 129 has a maximum within $R=\pm 3$ scan positions of the $165^{th}$ scan position.

Figure 10:
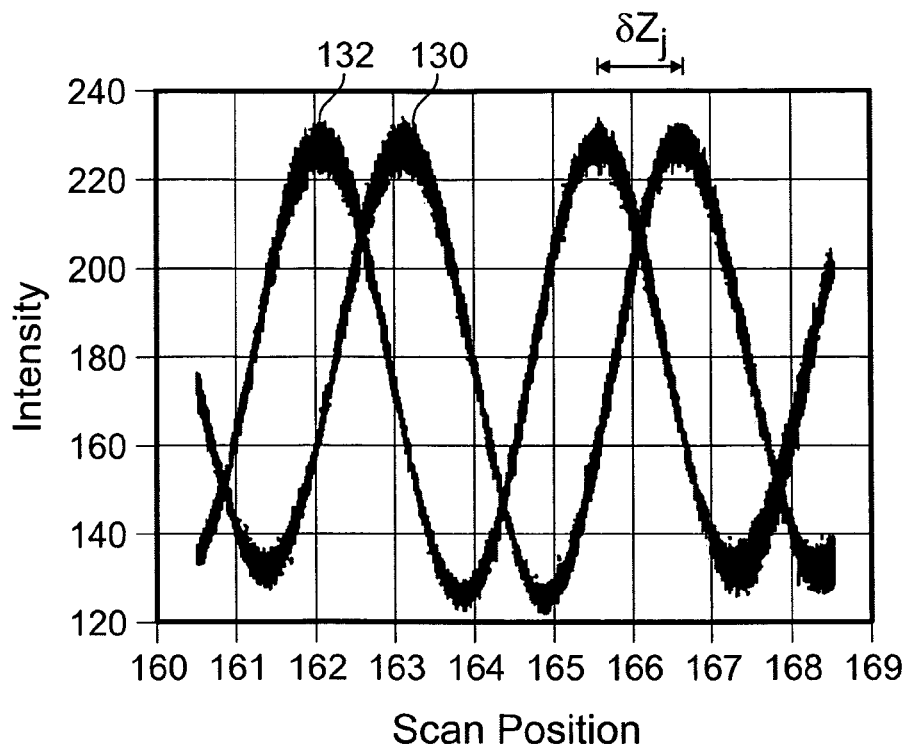
FIG. 10 illustrates (a) the relationship between intensity values within FIG. 8 as shown by FIG. 9 and information about the test object as expressed in scan position units and (b) the corresponding relationship for intensity values obtained at a scan position adjacent the common scan position of FIG. 8.

For each scan position, a scan value can be determined from the relationship between intensity values for the scan position (e.g., the intensity values for which the maximum of the corresponding interference signal is within ±R scan position increments (e.g., the intensity values corresponding to the pixels of group 129)) and information about the test object location corresponding to each intensity value. For example, a suitable relationship is exhibited in a scatter plot of the intensity values against the height of the test object spatial location corresponding to each intensity value. FIG. 10 shows such a relationship for the intensity values of group 129 of the 165$^{th}$ data set plotted as a scatter plot 130 against the heights of the test object locations and a similar relationship for the intensity values of a corresponding group of the 164$^{th}$ data set (not shown) plotted as a scatter plot 132 against the heights of the test object locations. The heights are expressed in units of scan position.

Scan values (e.g., scan value increments $\delta z_j$ (e.g., $\delta z_j = z_j - z_{j-1}$)) for successive scan positions (e.g., between the jth and jth−1 scan positions) can be determined based on the aforementioned relationships from the intensity values of the jth data set and the jth−1 data set. For example, the scan value increment $\delta z_{165}$ can be determined based on the scatter plots 130,132 (e.g., by determining the offset between the scatter plots). The scan value $z_{165}$ corresponding to the 165$^{th}$ scan position can be determined from the sum of scan increments determined for scan positions 1-164 (e.g., using the scan value increments $\delta z_j$ between successive pairs of scan position for scan positions 1-164). Alternatively, the scan value for each scan position can be determined directly from the scatter plot of intensity values for that scan position (e.g., from the phase of the scatter plot).

Information about the test object having reduced artifacts can be determined using the scan values zj corresponding to each scan position as determined from the scanning interferometry data. In some embodiments, the determination includes transforming interference signals of the scanning interferometry data into a frequency domain with respect to the scan values zj (e.g., by using generalized transform techniques discussed herein).

In some embodiments, a scan value between a pair of scan positions is determined by fitting a first function to intensities for a first scan position of the pair with respect to the information related to the corresponding test object spatial locations (e.g., by fitting a function to the relationship illustrated by scatter plot 130) and fitting a second function to intensities for the second scan position of the pair with respect to the information related to the corresponding test object spatial locations (e.g., by fitting a function to the relationship expressed by scatter plot 132). Scan values (e.g., scan value increments $\delta z_j$) between the data sets of the pair are determined from the parameters of the fitted functions.

In some embodiments, the parameters are determined from a least squares fit of first and second functions to scatter plots 130, 132. For example, scatter plot 130 can be fit to a function:

$$Ui = A + B'(\theta_i)\cos(\theta_i + \phi), \quad [7]$$

where, the $U_i$ are the intensity values of for the scan position (e.g., for the 165$^{th}$ scan position), A is a constant, the $\theta_i$ are related to the information about the test object spatial location corresponding to each intensity value as determined using the scanning interferometry data and initial scan values for the scan positions (e.g., $\theta_i$ can be height of the test object location corresponding to each intensity value $U_i$), $\phi$ is related to the offset from $\theta_i$ of the scan position (e.g., the offset for the 165$^{th}$ scan position), B' is the coherence envelope that depends on $\theta_i$, and i runs through all intensity values within the range determined by R. Scatter plot 132 can be fit to a function:

$$V_i = A' + B''(\theta_i)\cos(\theta_i + \phi) \quad (Eq.8)$$

the $V_i$ are the intensity values for the scan position (e.g., for the 164th scan position), A' is a constant, B" is the coherence envelope, $\phi$ is related to the offset from $\theta_i$ of the scan position (e.g., the offset of the 164$^{th}$ scan position). For clarity, the subscripts i are omitted in the following discussion.

For low coherence scanning interferometry data (e.g., SWLI data), the coherence envelope (e.g., B') can be described, for example, by:

$$B'(\theta) = B\theta^2 + C\theta + D \quad (Eq.9).$$

The scatter plot data can be fit using least squares (e.g., matrix least squares). For example, the matrix equation for determining $\phi$ is:

$$M \cdot X = Y \quad (Eq.10),$$

where $$M = \begin{bmatrix} \sum 1 & \sum c\theta^2 & \sum c\theta & \sum c & -\sum s\theta^2 & -\sum s\theta & -\sum s \\ \sum c\theta^2 & \sum c^2\theta^4 & \sum c^2\theta^3 & \sum c^2\theta^2 & -\sum cs\theta^4 & -\sum cs\theta^3 & -\sum cs\theta^2 \\ \sum c\theta & \sum c^2\theta^3 & \sum c^2\theta^2 & \sum c^2\theta & -\sum cs\theta^3 & -\sum cs\theta^2 & -\sum cs\theta \\ \sum c & \sum c^2\theta^2 & \sum c^2\theta & \sum c^2 & -\sum cs\theta^2 & -\sum cs\theta & -\sum cs \\ \sum s\theta^2 & \sum cs\theta^4 & \sum cs\theta^3 & \sum cs\theta^2 & -\sum s^2\theta^4 & -\sum s^2\theta^3 & -\sum s^2\theta^2 \\ \sum s\theta & \sum cs\theta^3 & \sum cs\theta^2 & \sum cs\theta & -\sum s^2\theta^3 & -\sum s^2\theta^2 & -\sum s^2\theta \\ \sum s & \sum cs\theta^2 & \sum cs\theta & \sum cs & -\sum s^2\theta^2 & -\sum s^2\theta & -\sum s^2 \end{bmatrix} \quad [11]$$

in which the sum indicates the sum over all the intensity values, $s = \sin(\theta)$ and $c = \cos(\theta)$, Y is given by:

$$Y = \begin{bmatrix} \sum U \\ \sum Uc\theta^2 \\ \sum Uc\theta \\ \sum Uc \\ \sum Us\theta^2 \\ \sum Us\theta \\ \sum Us \end{bmatrix} \quad [12]$$

and the solution vector X is:

$$X = \begin{bmatrix} A \\ a \\ b \\ c \\ d \\ e \\ f \end{bmatrix} \qquad [13]$$

in which a=B cos(φ), b=C cos(φ), c=D cos(φ), d=B sin(φ), e=C sin(φ) and f=D sin(φ) are the least squares fitting parameters. A similar equation is used to determine φ from the intensity values for the 164$^{th}$ scan position. The offsets φ and φ can be found in several ways from the fitted parameters (e.g., by using the arctangent of the ratios of the appropriate fitted parameters: φ (or φ)=arc tan(f/c), arc tan(e/b), or arc tan(d/a)). The scan value increment $\partial z_{165,164}$ between the 164$^{th}$ and 165$^{th}$ scan positions is given by $\partial z_{165,164}$=φ-φ.

Without being bound by theory, it is believed that the parameters a-f of the solution vector X are not independent because there are only 5 unknowns in the equations for the Ui and Vi. Reducing the number of unknowns to 5 by incorporating constraints on the fitted parameters $$\left( \text{e.g., } \frac{d}{a} = \frac{e}{b} = \frac{f}{c} \right)$$

provides a nonlinear equation that can be solved using iterative techniques to determine the offsets and scan increment. However, the least squares approach discussed above is the simplest linear fit and can be solved uniquely without iteration.

While a method for determining scan values for a scan position has been described as including fitting a function to a relationship between intensity values of the scan position and information about the object corresponding to each intensity value, other methods for determining the scan increments can be used. For example, in some embodiments, the relationships illustrated by scatter plots 130,132 are transformed (e.g., by a one-dimensional transformation, which can be accomplished by a Fourier transformation) into a frequency domain with respect to the information about the spatial locations of the test object determined from the scanning interferometry data and initial scan values. In some embodiments, the fit to the relationship is transformed. In other embodiments, the intensity values themselves (e.g., information of the scatter plots) are transformed by, for example, a discrete Fourier transform similar to that expressed in Eq. 5 in which the intervals between successive intensity values along the x-axis are different. The scan value increment $\partial z_j$ can be determined from transformed fits or scatter plots by:

$$\partial z_j = \cos^{-1}\left( \frac{w \cdot v}{|w||v|} \right), \qquad \text{(Eq. 14)}$$

where w is a two-element vector containing the real (e.g., cosine) and imaginary (e.g., sine) components of the fundamental frequency of the oscillations of the scatter plot of the jth data set and v is a two-element vector containing the real (cosine) and imaginary (sine) components determined for the fundamental frequency of the oscillations of the scatter plot of the jth–1 data set. The scan increment δzi can be described as the angle between the fundamental frequencies of the scatter plots of the jth and jth–1 data sets. The method is repeated to determine all the δzi.

The transform analysis of the scatter plots to determine the δzi can be accomplished by, for example, using a phase shifting interferometry (PSI) algorithm. For example, a 7 or 13 data set PSI algorithm can be used. In some embodiments, the algorithm is selected to have reduced sensitivity to small contrast variations in the scatter plots.

While methods for determining a scan value from a relationship between intensity values for a scan position and information about the test object location corresponding to each intensity value have been described as using information at a single frequency (e.g., the phase of the fundamental frequency $v_0$ of each scatter plot), information from other frequencies of the relationships expressed by scatter plots 130,132 can be used. Typically, the other frequencies are higher harmonics (e.g., odd harmonics such as $3v_0$, $5v_0$, and $7v_0$) of the fundamental frequency $v_0$ of each scatter plot.

As discussed above, the relationship between the intensity values for a scan position and the information about the test object spatial locations (e.g., the scatter plots 130,132) is determined from the scanning interferometry data themselves (e.g., by using initial scan values for the scan positions to determine the information about the test object spatial locations). Non-ideal scan mechanism motion can perturb these relationships so that the higher harmonics of the fundamental frequency $v_0$ of each scatter plot (e.g., the phases of the higher harmonics) also carry information about the scan value for each scan position. As discussed next, scan values can be determined from the relationships expressed by scatter plots 130,132 by correcting the phase at the fundamental frequency based on the properly weighted phases of higher harmonics of the fundamental frequencies.

We first discuss a first order correction that includes information from the third harmonic (e.g., the frequency $3v_0$). A two element vector $\hat{S}(v_0)$ containing the real (cosine) and imaginary (sine) components of the fundamental frequency $v_0$ of the relationship expressed by a scatter plot of intensities for a scan position corrected for vibrational distortion using information from the frequency $3v_0$ is given by:

$$\hat{S}(v_0) = S(v_0) + S(3v_0)\exp(-i3\hat{\Phi}) \qquad \text{(Eq. 15)}$$

where $S(v_0)$ is a two element vector containing the real and imaginary components at the fundamental frequency $v_0$ resulting from the transformation of the scatter plot into a frequency domain with respect to the information about the spatial locations of the test object determined from the scanning interferometry data and scan values, $S(3v_0)$ is a two element vector containing the real and imaginary components at $3v_0$ resulting from the transformation of the scatter plot, and is the phase of the scatter plot at the fundamental frequency given by the arctangent of the ratio of the imaginary and the real components of uncorrected fundamental frequency the transformed scatter plot.

The scan value increment δzj between the jth scan position and the jth–1 scan position is given by:

$$\partial z_j = \cos^{-1}\left\{\frac{\text{Re}(\hat{S}(v_0)_j \hat{S}^*(v_0)_{j-1})}{|\hat{S}(v_0)_j||\hat{S}(v_0)_{j-1}|}\right\} \quad \text{(Eq. 16)}$$

where $\hat{S}(v_0)_j$ is the corrected vector of real and imaginary components (Eq. 15) at the fundamental frequency for the jth scan position, $\hat{S}(v_0)_{j-1}$ is the corrected vector of real and imaginary components at the fundamental frequency for the jth−1 scan position, * indicates the complex conjugate.

In general, the corrected two component vector can be determined by using information from the $N^{th}+1$ higher harmonic by:

$$\hat{S}(v_0) = \sum_{k=0}^{N} S([2k+1]v_0)\exp(-i2k\hat{\Phi}) \quad \text{(Eq. 17)}$$

where Eq. 17 yields Eq. 15 when k=1. In some embodiments, the corrected vector $\hat{S}(v_0)$ is determined by using information from the $N^{th}+1=5$ (e.g., 7, 9, 11 or higher) harmonic.

Because the scatter plots 130,132 contain only limited number of oscillations (e.g., the scatter plots illustrate a variation in the phase of detected interference intensity of only about $2\pi$), a window (e.g., a Hamming window) can be used to attenuate spurious oscillations introduced by transforming the scatter plots into the frequency domain.

The generally high point density of the scatter plots means that the Nyquist criterion will not usually limit the correction order (the value of N in Eq. (17)). Though the contributions from each spectral component are automatically weighted by their power, it is good practice to limit the highest order to the one whose power falls below the spectral background to minimize noise driven phase contributions. In certain situations, vibrations with amplitudes of 10 nanometers or less can be corrected with a $2^{nd}$ order correction.

A scan value increment determined from scanning interferometry data for successive scan positions may depend on the mean interference frequency across the modulation envelope (e.g., beneath envelope B' of Eqs. 7 and 8). Without being bound by theory it is believed that the mean interference frequency may vary beneath the envelope resulting from real light sources. This variation can produce small errors in the scan value increments (e.g., errors of no more than about 5% of the scan value increment) when using R greater than about 10. These errors can be measured and corrected. For example, scan value increments determining pixels satisfying different values of R can be compared to determine the dependence of the scan value increment on the position of the selected intensity values with respect to the maximum of the interference signal. This dependence can be determined using the test object itself or a calibration object.

While Eqs. 15 and 17 for determining corrected cosine and sine components have been described as being applied to intensity values obtained from a common scan position, such corrected components can be determined for intensity values obtained from multiple scan positions along the scan dimension axis. For example, Eq. 19 can be applied to interference signals corresponding to different test object spatial locations, such as interference signal 75 of FIG. 2. Typically, the intensity values are obtained for scan positions separated by about $\lambda_0/10$ or less (e.g., by about $\lambda_0/12$ or less, by about $\lambda_0/15$ or less, e.g., by about $\lambda_0/18$ or less) along the scan dimension axis. Such sampling densities limit (e.g., prevent) spectral overlap between the fundamental frequency of the interference signal fringes and harmonics. Applying Eqs. 15 or 17 to interference signals rather than to intensities from a common scan position advantageously determines the scan value increment for each pixel independently. Hence, the method can correct for scan position errors that vary for the pixels of a common scan position. Such errors can arise, for example, from turbulence in large aperture interferometers.

The method of determining scan value increments from scanning interferometry data can include correcting intensity variations unrelated to interference intensity variations for different spatial locations for a common scan position. For example, intensity variations caused by test object reflectivity variations or intensity variations in the illuminating light can be corrected by, for example, offsets and/or gain corrections of the intensity data as a function of position within the two-dimensional array of intensity values.

While methods for determining a scan increment between scan positions have been described as determining a single scan value increment, more than one (e.g., at least 3, at least 4) scan value increments can be determined based on intensity values for each of respective common scan positions. For example, the two-dimensional array of intensity values (e.g., pixels) can be segmented into multiple sections and a separate scan increment determined for each section. Information about the test object spatial locations corresponding to the intensity values within each section is determined using the scan value increment for each section. This method can correct for spatial dependencies in the scan position errors caused by, for example, wobble or turbulence.

While scanning interferometry data have been described as being obtained by varying an OPD (e.g., by moving a test and/or reference object), other configurations are possible. For example, in some embodiments, scanning interferometry data are obtained by varying a wavelength of that light interferes at the detector. Each scan position typically corresponds to a different wavelength of detected interfering light (e.g., to a different central wavelength of the detected interfering light). Each scan position increment typically corresponds to a difference in the wavelength between scan positions.

Any of the methods described above can be implemented, for example, in computer hardware, software, or a combination of both. The methods can be implemented in computer programs using standard programming techniques following the descriptions herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

While methods for determining scan values from scanning interferometry data have been described, scan values (e.g., scan value increments) can be determined (e.g., measured) using data other than the scanning interferometry data to be corrected. For example, in some embodiments, an inline sensor (e.g., an encoder or distance measuring interferometer that detects light that has passed through the same optic as light reflected from the test object) is used to measure the scan values for scan positions. In some embodiments, the inline sensor, measures motion of the scan mechanism (e.g., along the scan dimension axis). An inline sensor can reduce (e.g., eliminate) any need to precalibrate or modify the scan mechanism to have for purely linear motion. Hence, low-cost scan mechanisms such as ball or roller bearing translation stages can be used.

Figure 11:
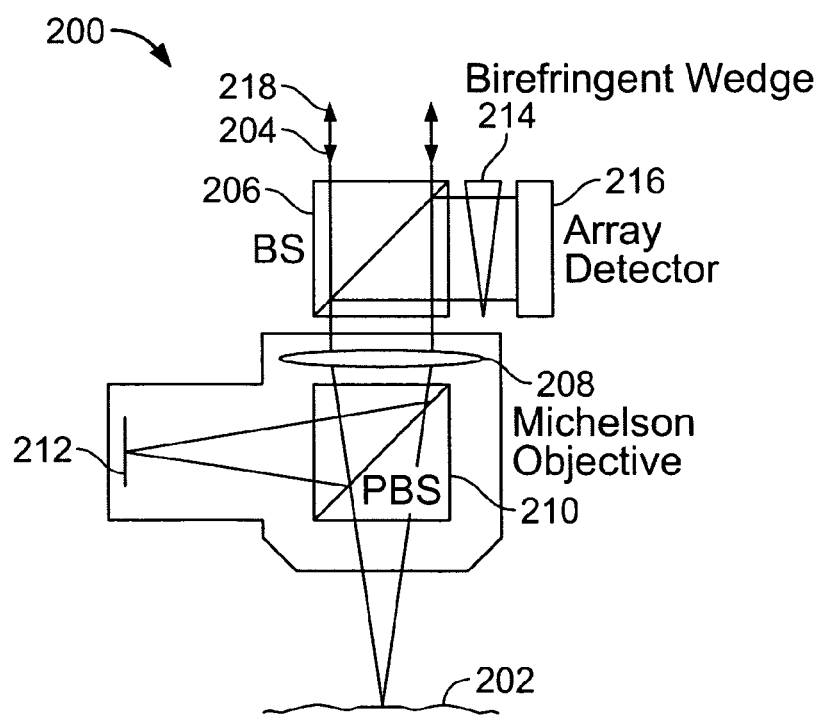
FIG. 11 illustrates an embodiment of an interferometer having a sensor for measuring scan position increments.

In some embodiments, an inline sensor provides the information needed to correct for vibration induced errors. For example, an interferometer with a polarization based sensor 200 as shown in FIG. 11 monitors the cavity OPD variation and provides compensation for both scan mechanism non-uniformity and vibration induced motions when the measured scan values are used to determine (e.g., based on a generalized transformation) information about a test object 202. Sensor 200 includes a light source, outputs an incident light beam 204, a first beam splitter 206, a focusing optic 208 (e.g., a lens system), a polarization beam splitter (PBS) 210, a reference object 212, a birefringent wedge 214, and an array detector 216.

In use, incident light beam 204 passes through beam splitter 206 and is received by optic 208, which creates a converging beam that is received by PBS 210. A first polarization (e.g., a first linear polarization) of the converging beam is directed to test object 202. A second polarization (e.g., a linear polarization orthogonal to the first polarization) is directed to the reference object 212. PBS recombines light reflected from the test and reference objects. The recombined light is received by optic 208 beamsplitter 206, which directs a first portion 215 of the received light to wedge 214. A second portion 218 of the received light is directed to a second array detector (not shown) for obtaining scanning interferometry data.

Wedge 214 refracts the first and second polarizations to a different extent. Consequently, the different polarizations are displaced with respect to one another and form interference fringes on detector 216. The phase of the interference fringes is related to motion of the test and reference objects. During acquisition of scanning interferometry data, the phase can be repeatedly monitored (e.g., by fast Fourier transformation (FFT)) of the fringes detected by detector 216. The phase can be used to determine a scan value for each scan position of the scanning interferometry data.

Figure 12:
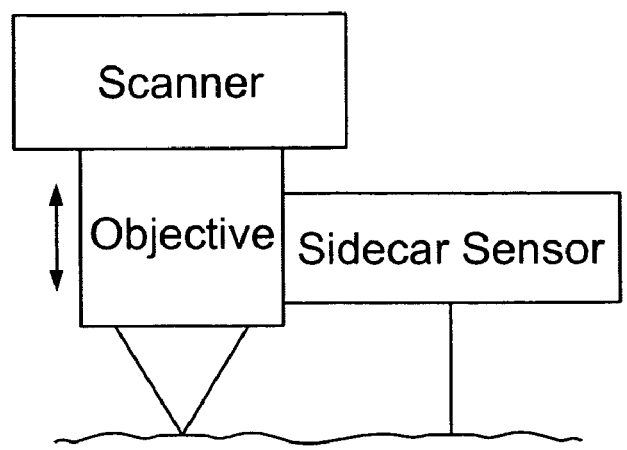
FIG. 12 illustrates an embodiment of an interferometer having a sensor for measuring scan position increments.

While inline sensors have been described, other configurations can be used. For example, in some embodiments the sensor is an external sensor that measures the motion of the scanner carriage relative to the test object or the motion of the optic that focuses light onto the test object relative to the test object. FIG. 12 shows an external sensor secured with respect to the focusing optic (e.g., the objective) that focuses light onto the test object. Which mode is used depends on where the sensor is mounted. Typically, the focusing optic is secured to the scan mechanism and moves as a unit. Hence, a sensor secured with respect to the focusing optic can measure the relative motion of the optic and test object. In general, both vibration and non-ideal scan mechanism motion can be corrected. If the monitored site is not identical to the measured site then care must be taken that the motion of the test surface at the monitored site is a bona-fide representation of the motion at the measurement site. If the external sensor is fixed to the focusing optic body rather than to the scan mechanism carriage, scan motion is not observable, and only vibration can be compensated for. In some embodiments, the external sensor is a single-point sidecar sensor (SPSS) or a multipoint sidecar sensor (MPSS).

Figure 13:
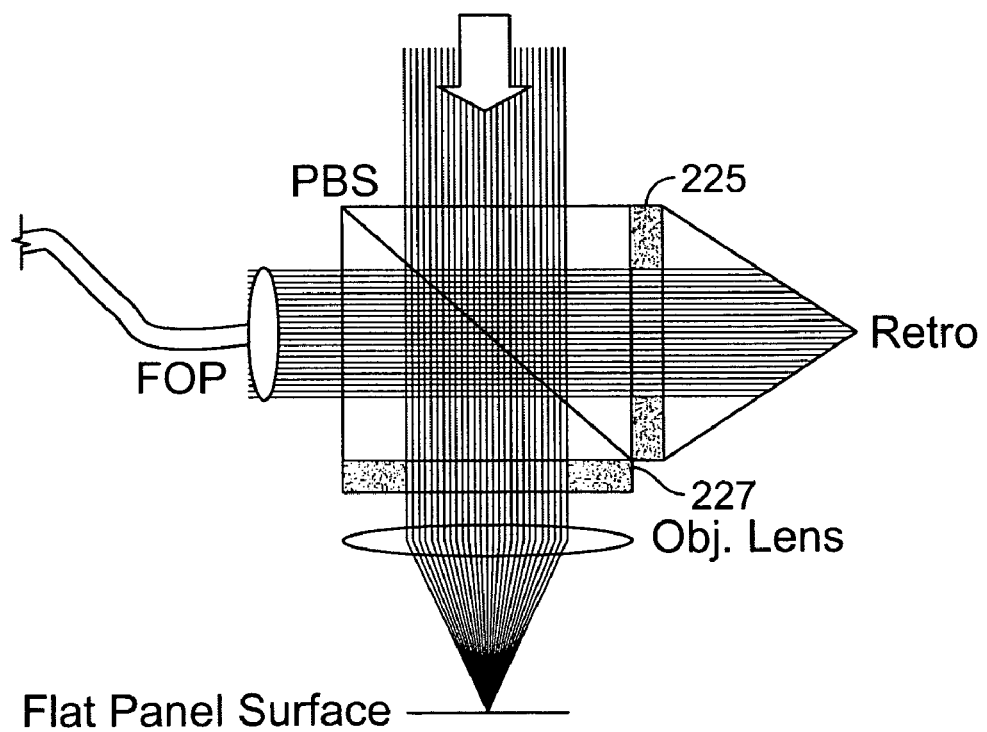
FIG. 13 illustrates an embodiment of an interferometer having a sensor for measuring scan position increments.

Referring to FIG. 13, a sensor includes a distance measuring interferometer (DMI) having a heterodyne laser (e.g., a model ZMI2000 heterodyne laser, Zygo Corporation—Middlefield, Conn.). The heterodyne laser outputs light at each of two closely spaced wavelengths that are coherent with respect to one another and have opposite polarizations. The light is received by a PBS that directs a first portion (e.g., light at one of the wavelengths) to a retro-reflector and a second portion (e.g., light at the other wavelength) to the test object (e.g., a surface of a flat panel display). Each portion of light passes twice through a respective ¼ waveplate 225 or 227. The light is at the two wavelengths is recombined and detected by a heterodyne detector (not shown). A fiber optic pickup (FOP) may be used to deliver the light to the detector. The detector detects a beat frequency related to the frequency difference between the light at the first wavelength and the light at the second wavelength. The beat frequency is sensitive to Doppler shifts caused by relative motion of the flat panel surface. Hence, the beat frequency can be used to determine non-ideal motion of the scan mechanism.

The objective lens can be, for example, a lens doublet (e.g, with a numerical aperture of about 0.1) or a microscope objective (e.g., with a numerical aperture of about 0.8 and a magnification of about 50×). In other embodiments, the wavelength of the interferometer source light is increased (e.g., to between about 8 and 12 microns using a thermal source) allowing numerical apertures of about 0.1 or less to be used.

Figure 14:
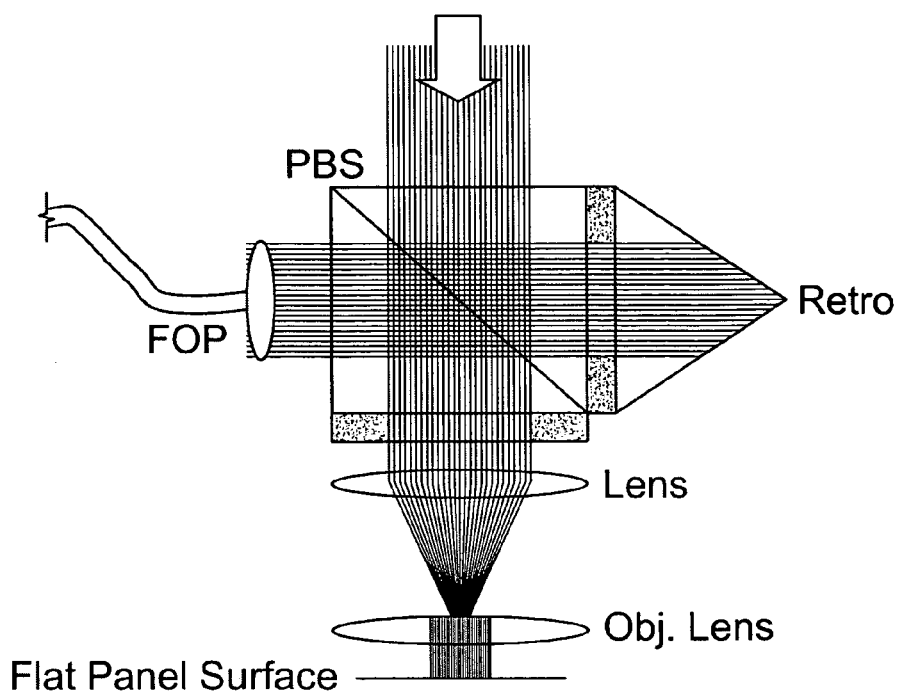
FIG. 14 illustrates an embodiment of an interferometer having a sensor for measuring scan position increments.

Referring to FIG. 14, a SPSS having a "Koehler" illumination geometry allows reduced sensitivity to the depth of focus by illuminating a test object (e.g., a flat panel surface) with a collimated light beam. Otherwise, the sensor of FIG. 14 is similar to that of FIG. 13.

In some embodiments, the scan value increments are determined by using a multi-point sensor (e.g., a MPSS). An image of the test object can be interfered with an image from a relatively tilted reference surface to allow instant phase-based measurement of the scan value increments. Such a sidecar sensor can be synchronized with the detector of the interferometer so that the scan value increments determined by the sensor can be used, for example, for generalized transform analysis of the test object.

Figure 15:
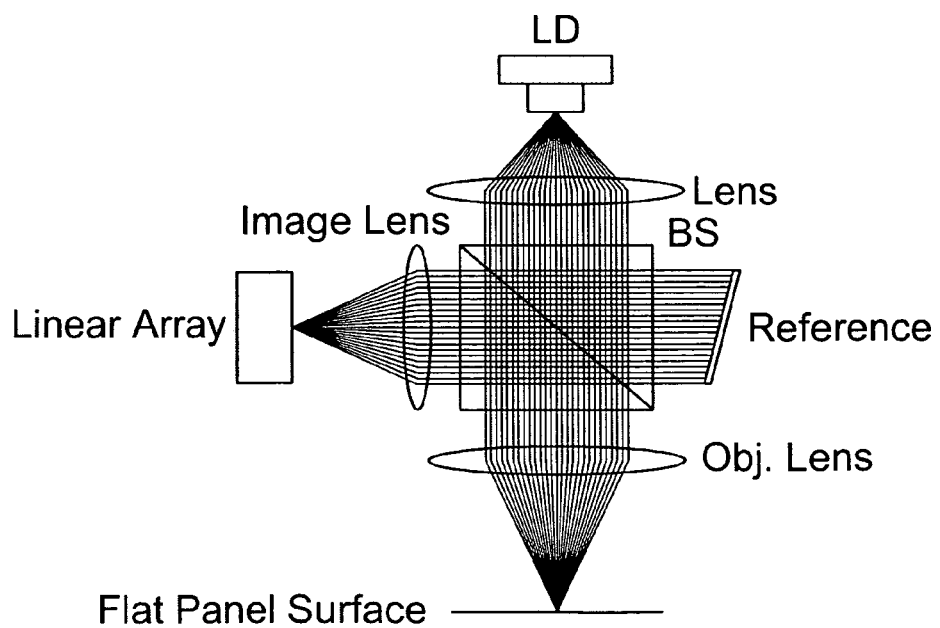
FIG. 15 illustrates an embodiment of an interferometer having a sensor for measuring scan position increments.

In embodiments, the multipoint sensor is a linear array oriented perpendicular to the fringes produced by the relative tilt between the test and reference objects. The fringes detected by the sensor can be analyzed by transformation (e.g., by Fourier transformation) to determine the phase variation and scan value increment. FIG. 15 shows such a sensor having a spatially extended source (e.g., a narrow-frequency source (e.g., a 670 nanometer laser diode) that illuminates a slit or one-dimensional screen to provide fringes across the field. Typically, the sensor interferometer arranged near OPD=zero to minimize wavelength stability dependence and thereby reduce source cost. The objective lens could be a low cost doublet rather than an objective since high quality imaging is not important. Furthermore, a low-NA may be used since post-processing need only extract the flat regions for analysis—thereby reducing sensitivity to focus. Only one line image is required per main sensor image. With an 8 bit, 512 pixel sensor, the additional data volume and processing is negligible. The sensor can be completely self-contained, with enough memory to hold the line images until requested by the main computer. Once the scan value increments are measured, they can be used to determine information about the test object (e.g., by generalized transform methods described herein).

Inline sensors that can be arranged to monitor motion of a scan mechanism are described by J. Schmit, A. Olszak, S. McDermed, "White light interferometry with reference signal," Proceedings of SPIE Vol. 4777, 102-109, (2002), the contents of which is incorporated herein by reference.

EXAMPLES

Example 1

An interferometer system was configured to obtain scanning interferometry data in the presence of vibrations. A flat test object was mounted on a modulating piezoelectric transducer (PZT) to impart vibrations with controlled amplitude and frequency to the test object. The test object was tilted to introduce carrier fringes within a portion of each data set.

Figure 16A:
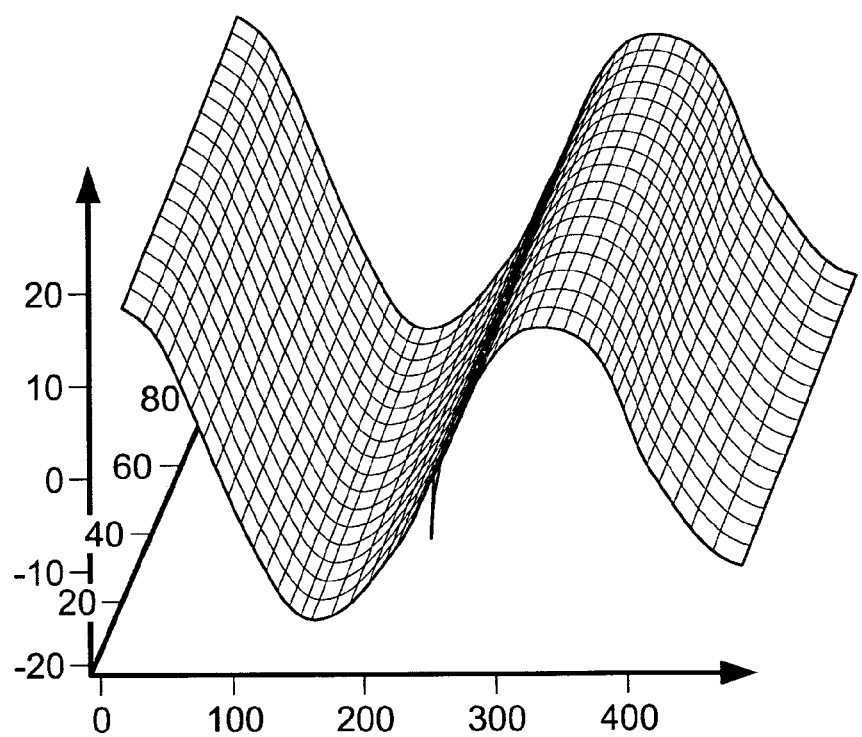
FIG. 16a illustrates a topography of a flat test object in the presence of a 1 HZ, 30 nanometer vibration determined using frequency domain analysis of scanning interferometry data based on scan positions of the data.
Figure 16B:
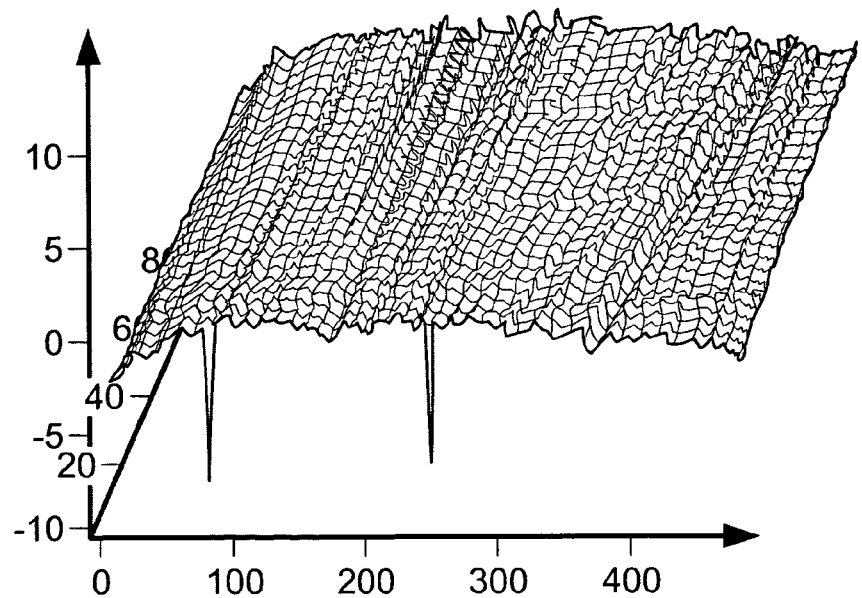
FIG. 16b illustrates a topography of the flat test object of FIG. 16b determined using generalized frequency domain analysis of scanning interferometry data based on scan values for the scan positions.
Figure 16C:
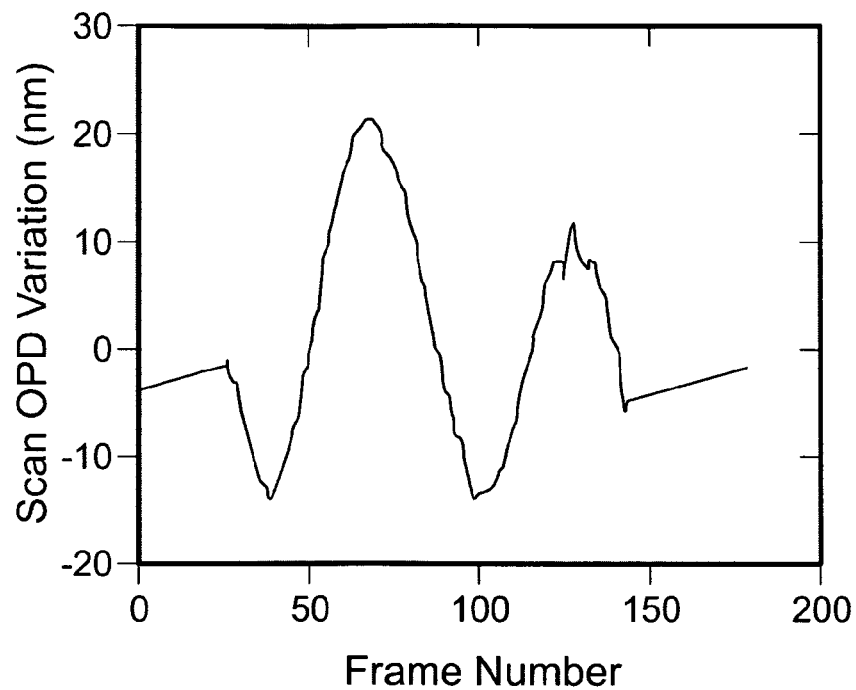
FIG. 16c illustrates optical path difference variations represented by the increments between the scan values used to determine the topography of FIG. 16b.

In a first study, a 1 Hz, 30 nanometer amplitude vibrational disturbance was applied. FIG. 16a shows the test object topography determined using FDA analysis based on the scan positions and FIG. 16b shows the test object topography determined using the generalized transform method described herein based on scan position values determined using a least squares approach (e.g., Eqs. 7 and 8). FIG. 16c shows the optical path variation as a function of scan position (e.g., data set number) along the scan dimension axis.

Figure 17A:
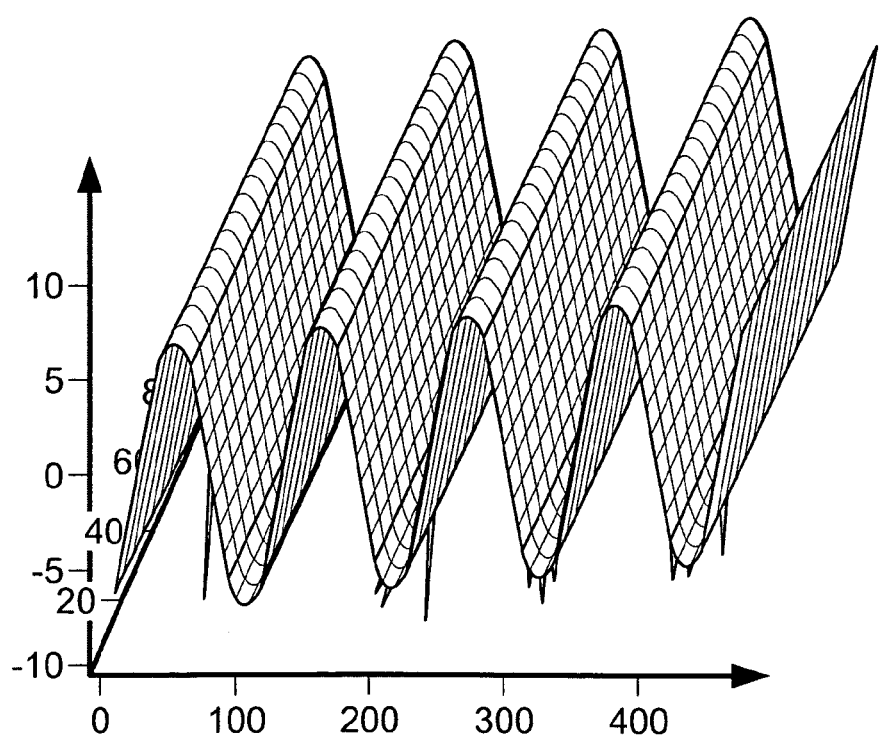
FIG. 17a illustrates a topography of a flat test object in the presence of a 3 HZ, 30 nanometer vibration determined using frequency domain analysis of scanning interferometry data based on scan positions of the data.
Figure 17B:
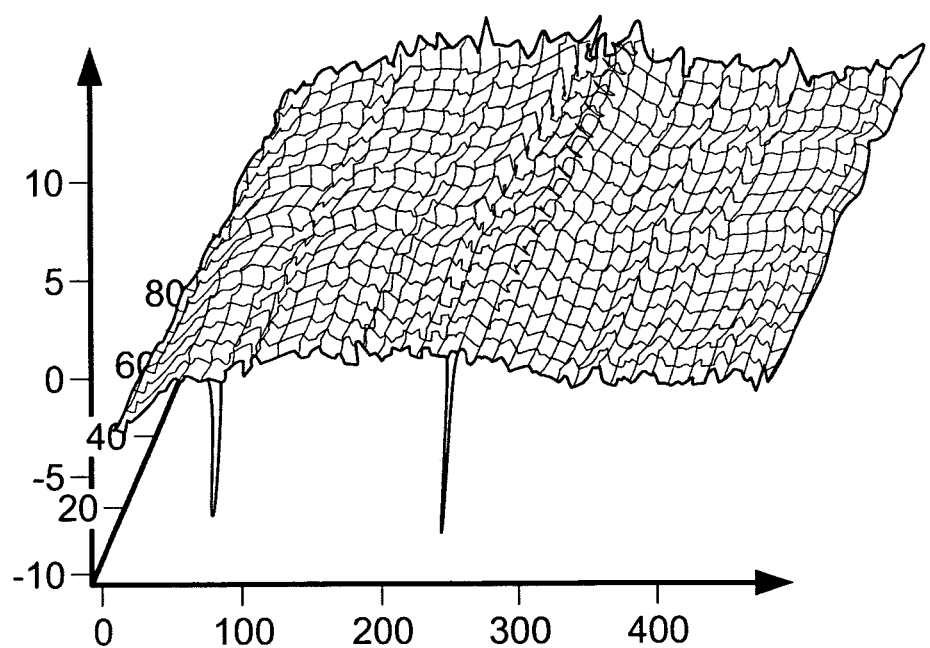
FIG. 17b illustrates a topography of the flat test object of FIG. 17b determined using generalized frequency domain analysis of scanning interferometry data based on scan values for the scan positions.
Figure 17C:
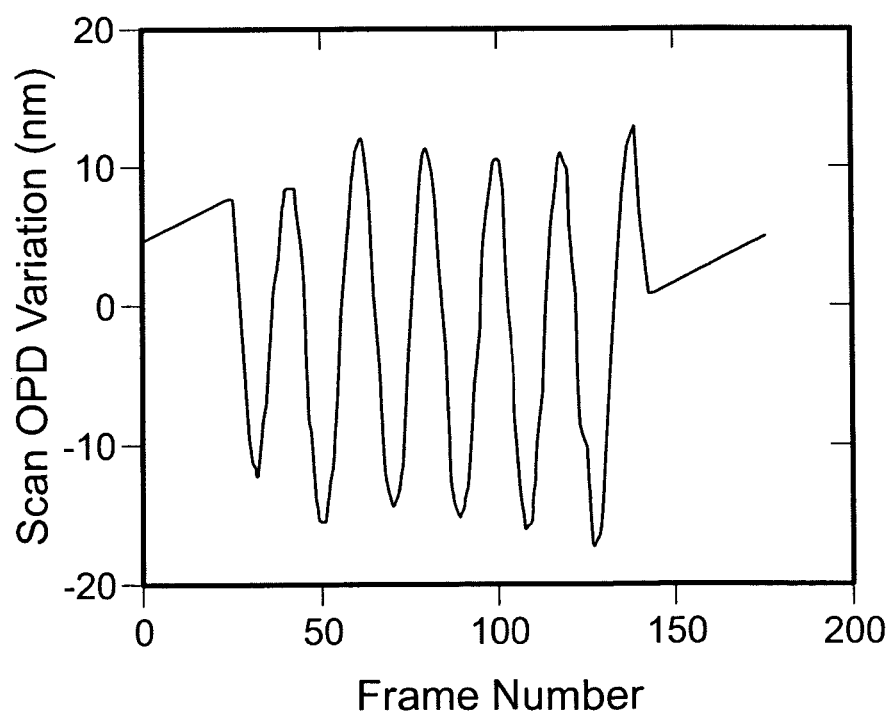
FIG. 17c illustrates optical path difference variations represented by the increments between the scan values used to determine the topography of FIG. 17b.

In a second study, a 3 Hz, 30 nanometer amplitude vibrational disturbance was applied. FIG. 17a shows the test object topography determined using FDA analysis based on the scan positions and FIG. 17b shows the test object topography determined using the generalized transform method described herein based on the scan position values determined from a least squares approach. FIG. 17c shows the optical path variation as a function of scan position (e.g., data set number) along the scan dimension axis.

In both FIGS. 16b and 17b it is evident that the generalized approach based on scan values provides a significantly more accurate representation of the flat test object.

Example 2

Scanning interferometry data was obtained from an 800 nanometer sphere using an interferometer with a 2.5× Nikon objective. The surface topography was determined out to 4 mrad local slope using both FDA based on the scan positions and generalized transformation based on scan value increments determined from the scanning interferometry data.

Figure 18:
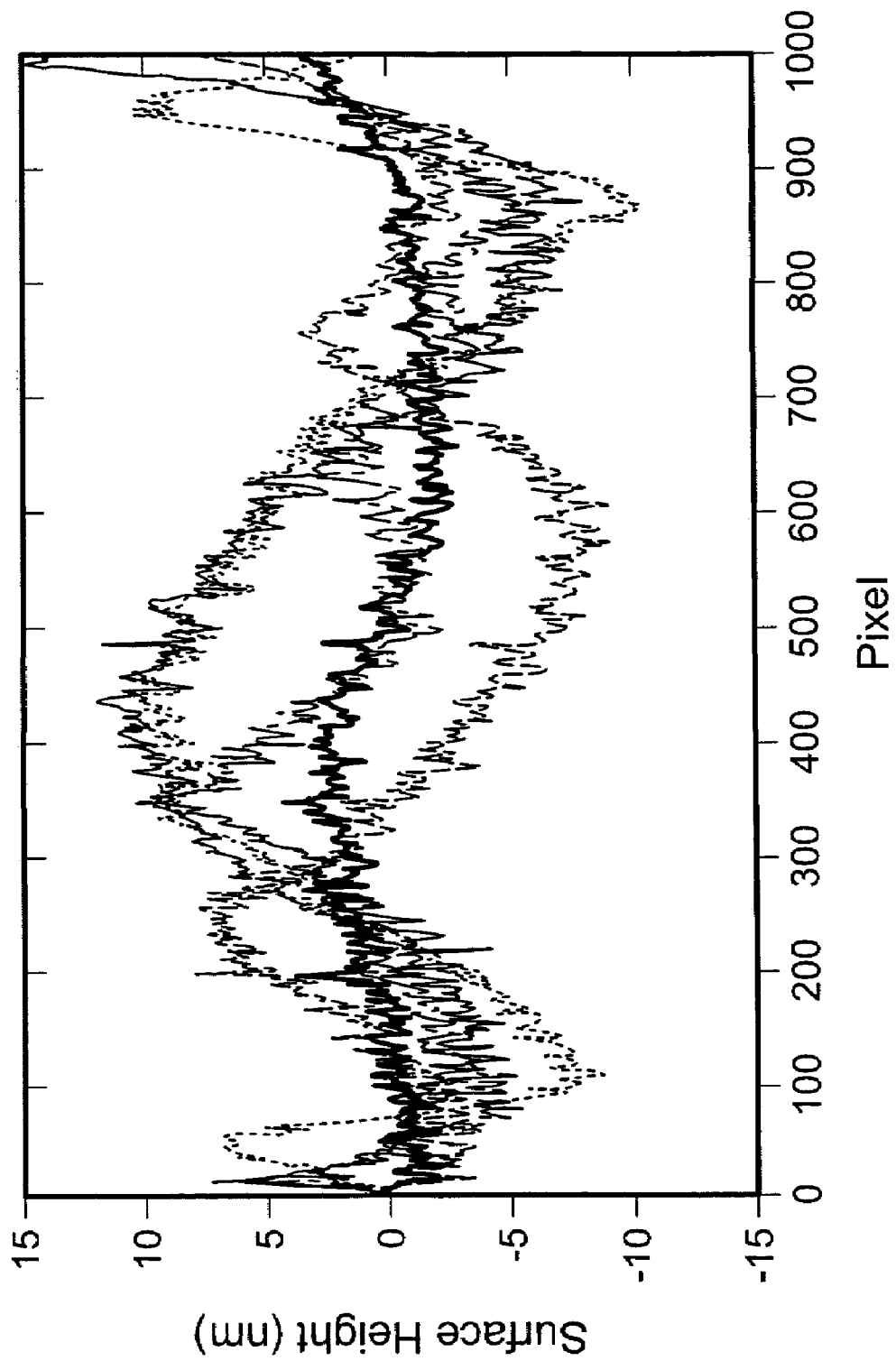
FIG. 18 illustrates the topography of a spherical object (with the spherical shape component removed) as determined from each of 4 independent sets of scanning interferometry data based on frequency domain analysis using the scan positions.
Figure 19:
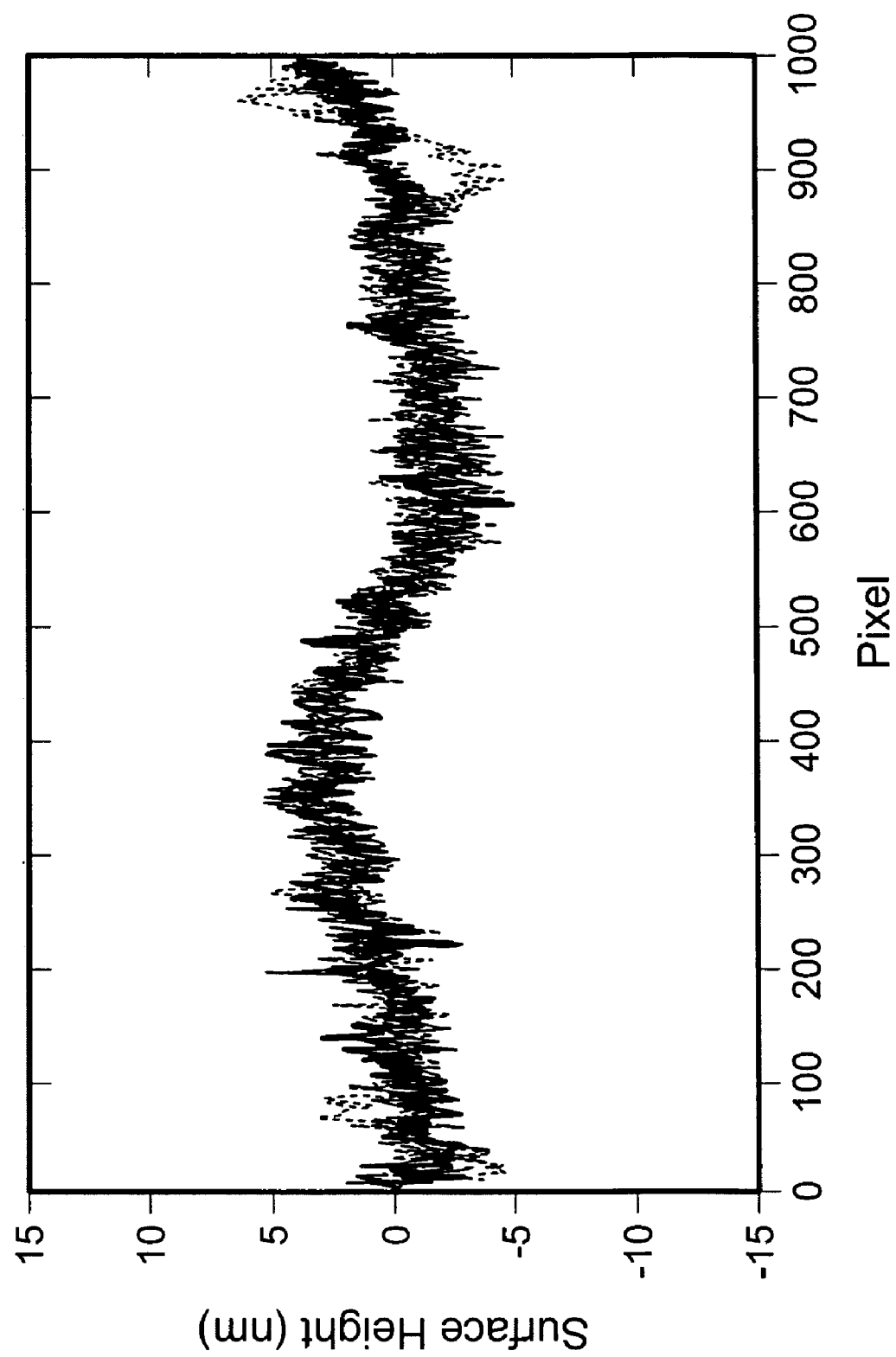
FIG. 19 illustrates the topography of the spherical object of FIG. 18 (with the spherical shape component removed) as determined from each of the 4 independent sets of scanning interferometry data based on generalized frequency domain analysis using scan values for the scan positions.

FIG. 18 illustrates the variation in the surface shape (with spherical curvature removed) based on each of 4 different sets of scanning interferometry data obtained from the sphere and using FDA analysis with initial values (e.g., uncorrected values) for the scan positions. FIG. 19 illustrates the variation in the surface shape (with spherical curvature removed) for 4 different determinations based on generalized transformation using the scan value increments determined from the interferometry data by a least squares approach (Eqs. 7 and 8).

The variation in the topography determined by FDA is almost entirely due to vibrational disturbances (FIG. 18). The similarity of the determinations using generalized transform illustrates the efficacy of this technique in determining information about test objects in the presence of vibrations (FIG. 19).

Figure 20:
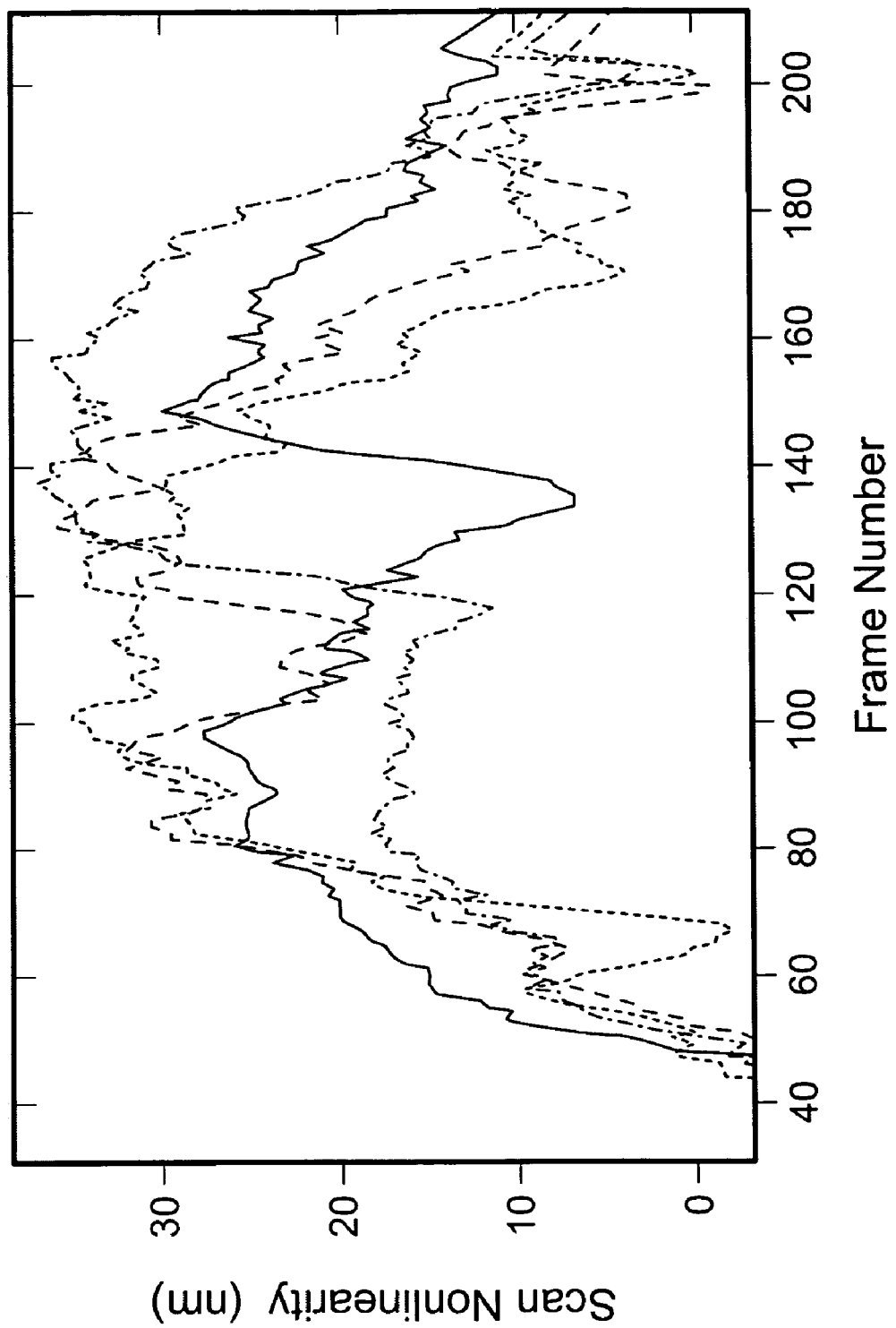
FIG. 20 illustrates the non-uniformity of the scan value increments between the scan values used to determine the topographies of FIG. 19.

Referring to FIG. 20, the non-uniformity (e.g., non-linearity) of the scan value increments determined from the scanning interferometry data of FIGS. 18 and 19 shows both random and systematic variation along the scan dimension axis.

Figure 21:
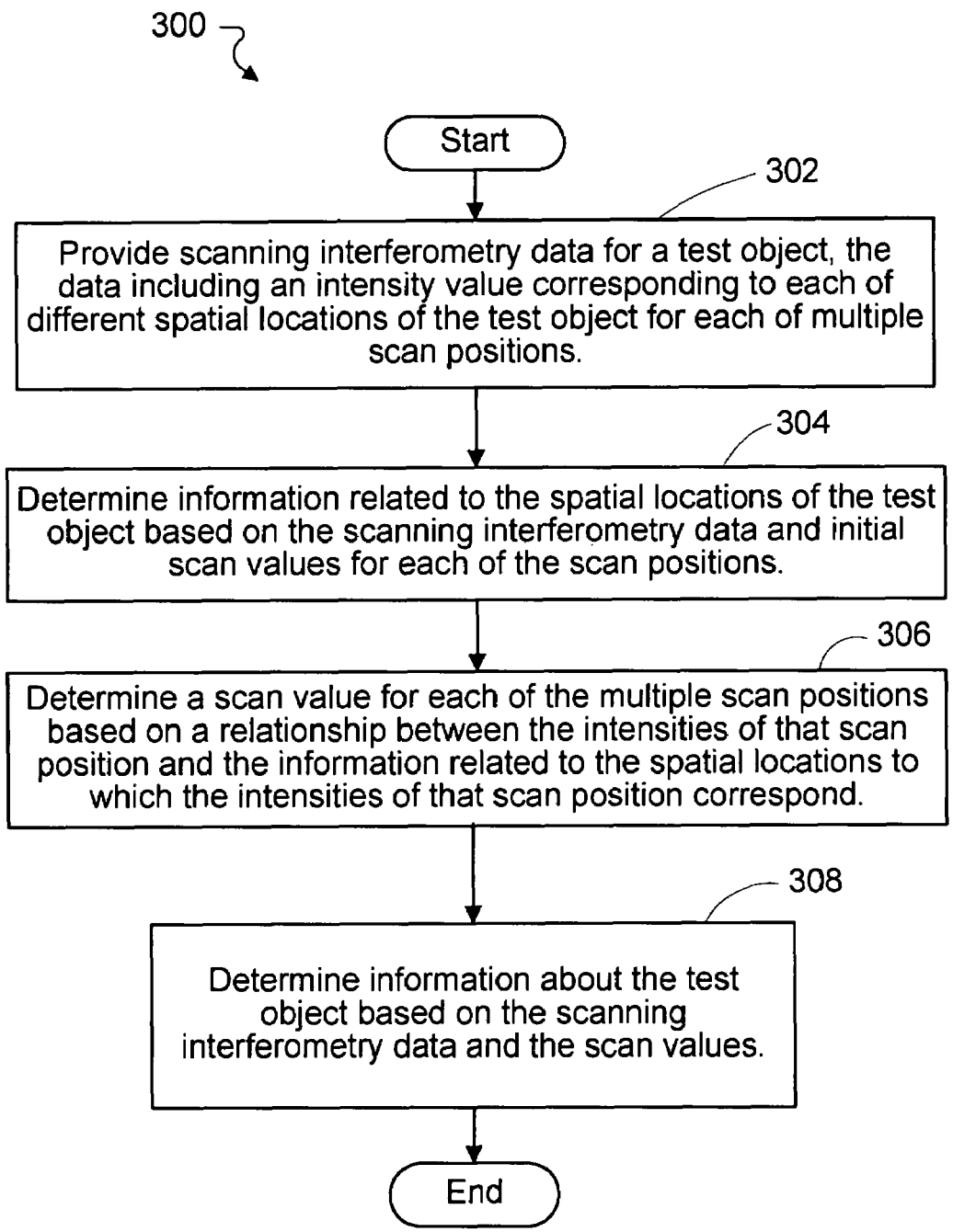
FIGS. 21 and 22 are flow diagrams of example processes.

FIG. 21 is a flow diagram of an example process 300 for determining one or more scan values for one or more of the multiple scan positions. The process 300 includes providing scanning interferometry data for a test object, the data including an intensity value corresponding to each of different spatial locations of the test object for each of multiple scan positions (302). The process 300 includes determining information related to the spatial locations of the test object based on the scanning interferometry data and initial scan values for each of the scan positions (304). The process 300 includes determining a scan value for each of the multiple scan positions based on a relationship between the intensities of that scan position and the information related to the spatial locations to which the intensities of that scan position correspond (306). The process 300 includes determining information about the test object based on the scanning interferometry data and the scan values (308).

Figure 22:
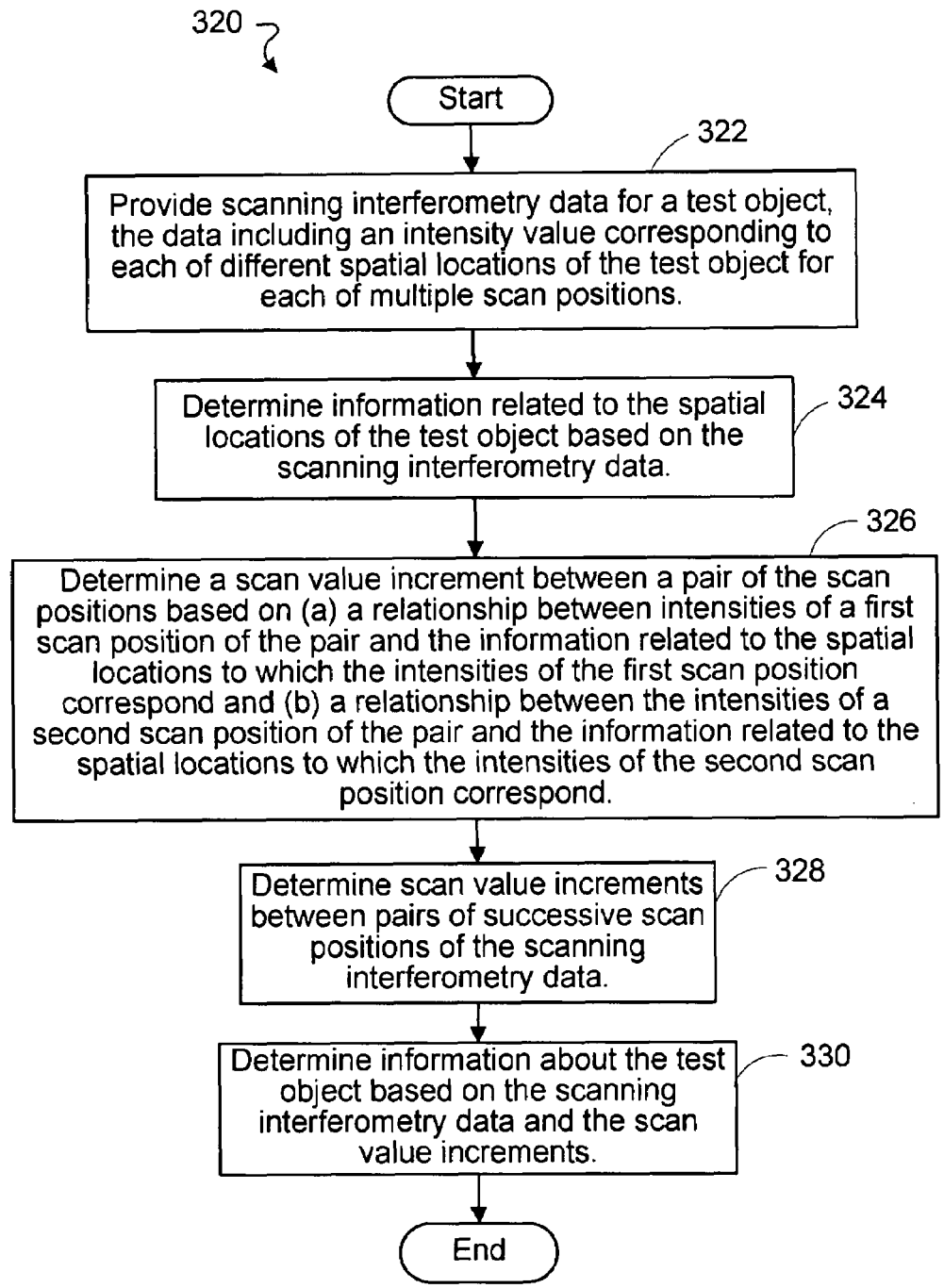

FIG. 22 is a flow diagram of an example process 320 for determining scan value increments between pairs of scan positions and information about a test object. The process 320 includes providing scanning interferometry data for the test object, the data including an intensity value corresponding to each of different spatial locations of the test object for each of multiple scan positions (322). The process 320 includes determining information related to the spatial locations of the test object based on the scanning interferometry data (324). The process 320 includes determining a scan value increment between a pair of the scan positions based on (a) a relationship between intensities of a first scan position of the pair and the information related to the spatial locations to which the intensities of the first scan position correspond and (b) a relationship between the intensities of a second scan position of the pair and the information related to the spatial locations to which the intensities of the second scan position correspond (326). The process 320 includes determining scan value increments between pairs of successive scan positions of the scanning interferometry data (328). The process 320 includes determining information about the test object based on the scanning interferometry data and the scan value increments (330).

Other aspects, features, and advantages are within the scope of the invention.

What is claimed is:

1. A method comprising:
   providing scanning interferometry data for a test object, the data comprising an intensity value corresponding to each of different spatial locations of the test object for each of multiple scan positions;
   determining information related to the spatial locations of the test object based on the scanning interferometry data; and determining a scan value for one of the multiple scan positions based on a relationship between the intensities of that scan position and the information related to the spatial locations to which the intensities of that scan position correspond, including determining a phase of a frequency of an oscillation of the intensities of the scan position with respect to the information related to the spatial locations to which the intensities of the scan position correspond.

2. The method of claim 1, wherein determining information related to the spatial locations of the test object is farther based on an initial scan value for each of the scan positions.

3. The method of claim 1, wherein:
the scan position for which the scan value is determined is a first scan position spaced apart from a second scan position by a scan position increment; and
determining a scan value for the first scan position comprises determining a scan value increment for the scan position increment based on (a) the relationship between the intensities of the first scan position and the information related to the spatial locations to which the intensities of the first scan position correspond and (b) a relationship between the intensities of the second scan position and the information related to the spatial locations to which the intensities of the second scan position correspond.

4. The method of claim 1, further comprising determining a scan value for each of additional ones of the multiple scan positions.

5. The method of claim 1, wherein determining the scan value for the scan position comprises transforming the intensities of the scan position into a frequency domain with respect to the information related to the spatial locations to which the intensities of the scan position correspond.

6. The method of claim 5, wherein the transformation is a one-dimensional transformation.

7. The method of claim 1, wherein determining a phase of a frequency of an oscillation of the intensities of the scan position with respect to the information related to the spatial locations to which the intensities of the scan position correspond comprises determining a phase of a fundamental frequency of an oscillation of the intensities of the scan position with respect to the information related to the spatial locations to which the intensities of the scan position correspond.

8. The method of claim 7, wherein determining the phase of the fundamental frequency includes using information about a phase of a frequency of at least a second oscillation of the intensities of the scan position with respect to the information related to the spatial locations to which the intensities of the scan position correspond, wherein the frequency of the second oscillation is at least 3 times the fundamental frequency.

9. A method comprising:
providing scanning interferometry data for a test object, the data comprising an intensity value corresponding to each of different spatial locations of the test object for each of multiple scan positions;
determining information related to the spatial locations of the test object based on the scanning interferometry data;
determining a scan value increment between a first pair of the scan positions based on (a) a relationship between intensities of a first scan position of the pair and the information related to the spatial locations to which the intensities of the first scan position correspond and (b) a relationship between the intensities of a second scan position of the pair and the information related to the spatial locations to which the intensities of the second scan position correspond; and
repeating the determining a scan value increment to determine a scan value increment between other pairs of the scan positions, wherein the scan value increments are non-uniform.

10. The method of claim 9, further comprising determining scan value increments between all pairs of successive scan positions of the scanning interferometry data.

11. The method of claim 9, comprising determining information about the test object based on the scanning interferometry data and the scan value increments.

12. The method of claim 9, wherein the information is determined based on the scanning interferometry data and initial scan values for the scan positions.

13. The method of claim 9, wherein determining a scan value increment comprises:
fitting a first function to the at least some intensities of the first one of the scan positions and the information related to the spatial locations corresponding to the at least some intensities;
fitting a second function to the at least some intensities of the second one of the scan positions and the information related to the spatial locations corresponding to the at least some intensities; and
determining the scan increment based on fitted parameters of the first and second functions.

14. The method of claim 9, wherein determining a scan increment comprises:
transforming at least some of the intensity values of the first scan position into a frequency domain with respect to the information related to the spatial locations corresponding to those intensity values of the first scan position; and
transforming at least some of the intensity values of the second scan position into a frequency domain with respect to the information related to the spatial locations corresponding to those intensity values of the second scan position.

15. The method of claim 9, wherein the determining a scan value increment between a pair of the scan positions comprises:
determining an offset between (a) a fundamental frequency of an oscillation of the at least some intensities of the first one of the scan positions with respect to the information related to the spatial locations corresponding to the at least some intensity values of the first one of the scan positions and (b) a fundamental frequency of an oscillation of the at least some intensities of the second one of the scan positions with respect to the information related to the spatial locations corresponding to the intensity values of the second one of the scan positions.

16. The method of claim 15, wherein the determining the offset comprises:
including information from an oscillation of at least about 3 times the fundamental frequency of the at least some intensities of the first one of the scan positions with respect to the information related to the spatial locations corresponding to the at least some intensity values of the first one of the scan positions; and
including information from an oscillation of about 3 times the fundamental frequency of the at least some intensities of the first one of the scan positions with respect to the information related to the spatial locations corresponding to the at least some intensity values of the second one of the scan positions.

17. A system comprising:
an interferometer configured to provide scanning interferometry data for a test object, the data comprising an intensity value corresponding to each of different spatial locations of the test object for each of multiple scan positions;
a processor configured to:
determine information related to the spatial locations of the test object based on the scanning interferometry data; and
determine a scan value for a scan position based on a relationship between the intensities of that scan position and the information related to the spatial locations to which the intensities of that scan position correspond, including determining a phase of a frequency of an oscillation of the intensities of the scan position with respect to the information related to the spatial locations to which the intensities of the scan position correspond.

18. The system of claim 17, wherein the processor is configured to determine information about the test object based on information related to the scan values.

19. The system of claim 17, wherein the processor is configured to determine the information related to the spatial locations of the test object based on the scanning interferometry data and initial scan values for the scan positions.

20. The system of claim 17 wherein determining a phase of a frequency of an oscillation of the intensities of the scan position with respect to the information related to the spatial locations to which the intensities of the scan position correspond comprises determining a phase of a fundamental frequency of an oscillation of the intensities of the scan position with respect to the information related to the spatial locations to which the intensities of the scan position correspond.

21. The system of claim 20 wherein the processor is configured to determine the phase of the fundamental frequency by using information about a phase of a second frequency of at least a second oscillation of the intensities of the scan position with respect to the information related to the spatial locations to which the intensities of the scan position correspond, wherein the second frequency is at least 3 times the fundamental frequency.

22. A method comprising:
providing scanning interferometry data for a test object, the data comprising an intensity value corresponding to each of different spatial locations of the test object for each of multiple scan positions;
determining information related to the spatial locations of the test object based on the scanning interferometry data and initial scan values for each of the multiple scan positions; and
determining refined scan values for each of the multiple scan positions based on a relationship between the intensities of the scan position and the information related to the spatial locations to which the intensities of the scan position correspond; and
determining information about the test object based on the interferometry data and the refined scan values for each of the multiple scan positions.

23. The method of claim 22 wherein the information related to the spatial locations of the test object comprises at least one of an optical path difference associated with one of the spatial locations and a phase of interference associated with one of the spatial locations.

24. A system comprising:
an interferometer configured to provide scanning interferometry data for a test object, the data comprising an intensity value corresponding to each of different spatial locations of the test object for each of multiple scan positions;
a processor configured to:
provide scanning interferometry data for a test object, the data comprising an intensity value corresponding to each of different spatial locations of the test object for each of multiple scan positions;
determine information related to the spatial locations of the test object based on the scanning interferometry data;
determine a scan value increment between a first pair of the scan positions based on (a) a relationship between intensities of a first scan position of the pair and the information related to the spatial locations to which the intensities of the first scan position correspond and (b) a relationship between the intensities of a second scan position of the pair and the information related to the spatial locations to which the intensities of the second scan position correspond; and
repeating the determining a scan value increment to determine a scan value increment between other pairs of the scan positions, wherein the scan value increments are non-uniform.

25. The system of claim 24 wherein the processor is configured to determine a scan value increment between a pair of the scan positions by determining an offset between (a) a fundamental frequency of an oscillation of the at least some intensities of the first one of the scan positions with respect to the information related to the spatial locations corresponding to the at least some intensity values of the first one of the scan positions and (b) a fundamental frequency of an oscillation of the at least some intensities of the second one of the scan positions with respect to the information related to the spatial locations corresponding to the intensity values of the second one of the scan positions.

26. The system of claim 25 wherein the processor is configured to determine the offset by including information from an oscillation of at least about 3 times the fundamental frequency of the at least some intensities of the first one of the scan positions with respect to the information related to the spatial locations corresponding to the at least some intensity values of the first one of the scan positions; and
including information from an oscillation of about 3 times the fundamental frequency of the at least some intensities of the first one of the scan positions with respect to the information related to the spatial locations corresponding to the at least some intensity values of the second one of the scan positions.

* * * * *

UNITED STATES PATENT AND TRADEMARK OFFICE
CERTIFICATE OF CORRECTION

PATENT NO. : 7,321,430 B2
APPLICATION NO. : 11/112332
DATED : January 22, 2008
INVENTOR(S) : Leslie L. Deck It is certified that error appears in the above-identified patent and that said Letters Patent is hereby corrected as shown below:

Column 20
Line 52, Equation 15, replace " $\hat{S}(v_0) = S(v_0) + S(3v_0)\exp(-i2\hat{\Phi})$ "

With -- $\hat{S}(v_0) = S(v_0) + S(3v_0)\exp(-i2\hat{\Phi})$ --

Column 27
Line 11, Claim 2, delete the word "farther" and replace it with --further--

Signed and Sealed this

Third Day of March, 2009

JOHN DOLL
*Acting Director of the United States Patent and Trademark Office*